US012073680B2

(12) United States Patent
Abrahamson et al.

(10) Patent No.: US 12,073,680 B2
(45) **Date of Patent: *Aug. 27, 2024**

(54) METHODS, DEVICES AND SYSTEMS FOR PROCESSING WAGERS ASSOCIATED WITH GAMES HAVING MULTIPLE WAGERS

(71) Applicant: AGS LLC, Las Vegas, NV (US)

(72) Inventors: Jamie Abrahamson, Las Vegas, NV (US); Zbigniew Czyzewski, Las Vegas, NV (US); Michael Skvorzov, Las Vegas, NV (US)

(73) Assignee: AGS LLC, Las Vegas, NV (US)

( * ) Notice: Subject to any disclaimer, the term of this patent is extended or adjusted under 35 U.S.C. 154(b) by 322 days.

This patent is subject to a terminal disclaimer.

(21) Appl. No.: 17/109,969

(22) Filed: Dec. 2, 2020

(65) Prior Publication Data

US 2021/0090380 A1 Mar. 25, 2021

Related U.S. Application Data

(63) Continuation-in-part of application No. 15/387,502, filed on Dec. 21, 2016, now Pat. No. 10,872,505, which is a continuation-in-part of application No. 15/149,410, filed on May 9, 2016, now Pat. No. 10,395,470.

(51) Int. Cl.
*G07F 17/32* (2006.01)
*A63F 1/00* (2006.01)

(52) U.S. Cl.
CPC .............. *G07F 17/322* (2013.01); *A63F 1/00* (2013.01); *G07F 17/3209* (2013.01); *G07F 17/3248* (2013.01); *G07F 17/3258* (2013.01); *G07F 17/3288* (2013.01); *G07F 17/3293* (2013.01);

(Continued)

(58) Field of Classification Search
CPC ......................... G07F 17/3293; G07F 17/3244
See application file for complete search history.

(56) References Cited

U.S. PATENT DOCUMENTS 4,861,041 A 8/1989 Jones et al.
5,393,067 A 2/1995 Paulsen et al.

(Continued)

FOREIGN PATENT DOCUMENTS

AU 2015203880 7/2015
WO 2000016868 3/2000

OTHER PUBLICATIONS

Wikipedia, the free encyclopedia, "Omaha hold 'em," https://en.wikipedia.org/w/index.php?title=Omaha_hold_%27em&oldid=722451289, May 28, 2016, 6 pages.

(Continued)

*Primary Examiner* — Malina D. Blaise
(74) *Attorney, Agent, or Firm* — WEIDE & MILLER, LTD.

(57) ABSTRACT

In a method and system for presenting a game, such as a table game having a base portion and at least one side bet feature, a single combined wager is received, such as at a first wagering location as detected by a wager input sensor, and the combined wager is allocated, such as by a table controller, to an ante required for the base portion of the game and to a side bet required to the side bet feature of the game. An allocated portion of the combined wager to the ante and side bet feature may be variable, such as based upon input of the operator.

19 Claims, 6 Drawing Sheets

(52) U.S. Cl.
CPC .... *A63F 2001/005* (2013.01); *G07F 17/3267* (2013.01)

(56) References Cited

U.S. PATENT DOCUMENTS

| | | | | |
|---|---|---|---|---|
| 5,472,194 | A | 12/1995 | Breeding et al. | |
| 5,544,892 | A * | 8/1996 | Breeding | G07F 17/3262 273/274 |
| 5,664,781 | A | 9/1997 | Feola | |
| 5,707,285 | A | 1/1998 | Place et al. | |
| 5,743,800 | A | 4/1998 | Huard et al. | |
| 5,911,418 | A | 6/1999 | Adams | |
| 5,984,779 | A | 11/1999 | Bridgeman et al. | |
| 6,206,373 | B1 | 3/2001 | Garrod | |
| 6,290,603 | B1 * | 9/2001 | Luciano, Jr. | G07F 17/3244 463/25 |
| 6,299,534 | B1 | 10/2001 | Breeding et al. | |
| 6,599,193 | B2 | 7/2003 | Baerlocher et al. | |
| 6,637,747 | B1 * | 10/2003 | Garrod | A63F 3/00157 463/13 |
| 6,702,289 | B1 * | 3/2004 | Feola | A63F 3/00157 273/274 |
| 6,929,264 | B2 | 8/2005 | Huard et al. | |
| 7,566,274 | B2 | 7/2009 | Johnson et al. | |
| 7,651,394 | B2 | 1/2010 | Johnson | |
| 7,931,532 | B2 | 4/2011 | Johnson | |
| 8,628,400 | B2 | 1/2014 | Aoki | |
| 8,740,692 | B2 | 6/2014 | Yoseloff et al. | |
| 8,961,298 | B2 | 2/2015 | Czyzewski et al. | |
| 9,053,601 | B2 * | 6/2015 | Seelig | G07F 17/32 |
| 9,478,099 | B2 | 10/2016 | Czyzewski et al. | |
| 9,536,379 | B2 | 1/2017 | Czyzewski et al. | |
| 9,662,563 | B2 | 5/2017 | Cryzewski et al. | |
| 9,811,980 | B1 * | 11/2017 | Kowalchuk | G07F 17/3293 |
| 10,083,576 | B1 * | 9/2018 | Hedge, Jr. | G07F 17/3293 |
| 10,699,528 | B2 * | 6/2020 | Leen | G07F 17/3239 |
| 2001/0031659 | A1 * | 10/2001 | Perrie | A63F 3/00643 463/18 |
| 2002/0195773 | A1 | 12/2002 | Dun | |
| 2003/0153377 | A1 | 8/2003 | Lisowski, Sr. | |
| 2004/0061288 | A1 | 4/2004 | Snow | |
| 2004/0090005 | A1 | 5/2004 | Snow | |
| 2004/0090006 | A1 * | 5/2004 | Foster | A63F 1/00 273/303 |
| 2004/0130098 | A1 * | 7/2004 | Duhamel | A63F 3/00157 273/292 |
| 2004/0183254 | A1 | 9/2004 | Schlumbrecht | |
| 2005/0107148 | A1 | 5/2005 | Webb | |
| 2006/0157934 | A1 * | 7/2006 | Yoseloff | A63F 1/18 273/292 |
| 2007/0060314 | A1 * | 3/2007 | Baerlocher | G07F 17/3258 463/25 |
| 2007/0060321 | A1 * | 3/2007 | Vasquez | G07F 17/32 463/27 |
| 2007/0069469 | A1 * | 3/2007 | Silverman | A63F 1/00 273/303 |
| 2007/0077987 | A1 * | 4/2007 | Gururajan | G07F 17/322 463/22 |
| 2007/0126186 | A1 | 6/2007 | Crawford, III et al. | |
| 2007/0194532 | A1 * | 8/2007 | Skistimas | G07F 17/3276 273/292 |
| 2008/0090651 | A1 * | 4/2008 | Baerlocher | G07F 17/34 463/27 |
| 2008/0108412 | A1 * | 5/2008 | Snow | A63F 1/00 463/20 |
| 2009/0124318 | A1 * | 5/2009 | Porto | G07F 17/32 463/13 |
| 2010/0087241 | A1 | 4/2010 | Nguyen et al. | |
| 2010/0113120 | A1 | 5/2010 | Snow | |
| 2011/0034237 | A1 | 2/2011 | Schulhof et al. | |
| 2011/0198809 | A1 * | 8/2011 | Sparago | A63F 3/00157 273/292 |
| 2011/0201398 | A1 * | 8/2011 | Parham | G07F 17/3262 463/13 |
| 2011/0316233 | A1 * | 12/2011 | Hong | A63F 3/00157 273/292 |
| 2012/0083341 | A1 | 4/2012 | George et al. | |
| 2012/0244924 | A1 * | 9/2012 | Willis | A63F 3/00157 273/292 |
| 2013/0059636 | A1 * | 3/2013 | Hedge, Jr. | A63F 1/00 463/42 |
| 2013/0130782 | A1 * | 5/2013 | Hornik | G07F 17/3251 463/25 |
| 2013/0150148 | A1 * | 6/2013 | Templeman | G07F 17/3258 463/25 |
| 2013/0157752 | A1 * | 6/2013 | Yoseloff | A63F 1/00 463/25 |
| 2013/0310165 | A1 * | 11/2013 | Witty | G07F 17/3244 463/27 |
| 2013/0324204 | A1 * | 12/2013 | Snow | A63F 3/00157 463/13 |
| 2014/0084543 | A1 * | 3/2014 | Snow | A63F 1/00 273/292 |
| 2014/0094279 | A1 * | 4/2014 | Lockard | G07F 17/3272 463/25 |
| 2014/0148231 | A1 * | 5/2014 | Berman | G07F 17/32 463/20 |
| 2014/0200071 | A1 | 7/2014 | Czyzewski et al. | |
| 2014/0370967 | A1 * | 12/2014 | Snow | G07F 17/3293 463/25 |
| 2015/0011306 | A1 * | 1/2015 | Soong | G07F 17/3258 463/27 |
| 2015/0018083 | A1 | 1/2015 | Czyzewski et al. | |
| 2015/0151190 | A1 * | 6/2015 | Durbin | G07F 17/326 273/292 |
| 2015/0199871 | A1 | 7/2015 | Czyzewski et al. | |
| 2015/0379821 | A1 | 12/2015 | LaDuca | |
| 2016/0005273 | A1 | 1/2016 | Costa | |
| 2016/0049045 | A1 * | 2/2016 | Snow | G07F 17/3244 463/25 |
| 2016/0086448 | A1 * | 3/2016 | Aoki | G07F 17/326 463/27 |
| 2016/0243433 | A1 * | 8/2016 | Ventura | G07F 17/322 |
| 2017/0039799 | A1 | 2/2017 | Czyzewski et al. | |
| 2017/0203198 | A1 * | 7/2017 | Lysowski | G07F 17/3262 |
| 2017/0206748 | A1 * | 7/2017 | Ventura | G07F 17/322 |
| 2018/0012455 | A1 * | 1/2018 | Costa | G07F 17/3293 |
| 2019/0188967 | A1 * | 6/2019 | Giuffria | G07F 17/3295 |
| 2020/0402367 | A1 * | 12/2020 | Oberberger | G07F 17/3223 |

OTHER PUBLICATIONS

Wikipedia, the free encyclopedia, “Texas hold ’em,” https:/ /en.wikipedia.org/w/index.php?title=Texas_hold_ %27em&oldid=718982670, May 6, 2016, 18 pages.

State of Washington Gambling Commission, “Mississippi Stud Training Manual,” http://www.wsgc.wa.gov/activities/game-rules/mississippi-stud.pdf, Oct. 28, 2014, 17 pages.

State of Washington Gambling Commission, “Texas Hold ’Em Bonus Training Manual,” http://www.wsgc.wa.gov/activities/game-rules/texas-hold-em-bonus.pdf, Oct. 28, 2014, 15 pages.

State of Washington Gambling Commission, “Ultimate Texas Hold ’Em Training Manual,” http://www.wsgc.wa.gov/activities/game-rules/ultimate-texas-hold-em.pdf, Aug. 11, 2014, 23 pages.

Shanghai Lanbao Sensing Technology Co., Ltd. “CR30S—Products,” http://www.shlanbao.cn/en/product/show.aspx?id=1139, Copyright 2011, printed Oct. 21, 2016, 2 pages.

Stmicroelectronics, “VL6180X—Proximity sensor, gesture and ambient light sensing “ALS” module,” http://www.st.com/en/imaging-and-photonics-solutions/v16180x.html, Copyright 2016, printed Oct. 21, 2016, 6 pages.

International Search Report and Written Opinion for PCT/US2017/012156 mailed Mar. 13, 2017, 27 pages.

International Search Report and Written Opinion for Application No. PCT/US2017/031511, mailed Aug. 7, 2017, 19 pages.

(56) References Cited

OTHER PUBLICATIONS

International Search Report and Written Opinion for Application No. PCT/US2017/031560, mailed Aug. 9, 2017, 20 pages.

* cited by examiner

METHODS, DEVICES AND SYSTEMS FOR PROCESSING WAGERS ASSOCIATED WITH GAMES HAVING MULTIPLE WAGERS

RELATED APPLICATION DATA

This application claims priority to and is a continuation-in-part of U.S. application Ser. No. 15/387,502, filed Dec. 21, 2016, which is a continuation-in-part of U.S. application Ser. No. 15/149,410, filed May 9, 2016, now U.S. Pat. No. 10,395,470, which prior applications are incorporated by reference in their entirety herein.

FIELD OF THE INVENTION

The present invention relates to methods of presenting and playing games and devices configured to present games.

BACKGROUND OF THE INVENTION

A variety of house banked poker-style games are known and many are quite popular. However, players are always seeking new and exciting games. At the same time, it is difficult to develop viable new games. In particular, while there is an infinite number of potential game play options or variations, most combinations of game features result in games which are untenable, such as because the game plays too slowly, because the house hold is too high (making the game undesirable to the player), because the house hold is too low (making the game undesirable to the house), or for other reasons.

As one example, house banked poker-style games are very popular and many variations of house banked poker games exist, each having slightly different features. For example, one existing house banked poker game is the game of Mississippi Stud™. In this game, each player plays against a pay table (and not the dealer or other players). While the game offers multiple wagering opportunities (an ante wager and three "Street" bets), it is a stud-type game in which a player's hand is set by the two cards which are dealt to the player and three community cards, which thus limits the potential player hands.

Another popular game is the game of Texas Hold'em Bonus™. In the base game of this game the player plays their hand against the dealer's hand. In the base game, the game offers the change for the player to form a best hand from two player cards and five community cards, thus introducing some game play strategy. The game offers the player the opportunity to place multiple bets, including ante, flop, turn and river bets. However, several of those bets (the turn and river bets) are optional. In addition, the player must have a qualifying hand in order to win their ante wager.

Another popular game is Ultimate Texas Hold'em™. In the base game of this game the player again has the opportunity to place multiple wagers, including an ante, blind and play bets, as well as optional raise bets. In this game, the dealer's hand must have a qualifying rank. If it does not, then the player's ante wager is a push. Thus, one aspect of both Texas Hold'em Bonus™ and Ultimate Texas Hold'em™ is that a player may "check" at various betting windows and yet still remain in the game, thus reducing the stakes and thus the potential excitement of the game.

Gaming devices and games which overcome disadvantages with existing games are desired.

SUMMARY OF THE INVENTION

Embodiments of the invention comprise methods of playing and presenting games and gaming devices and systems for implementing the game.

In one embodiment of the invention, a method of playing and presenting a game offers players the opportunity for multi-tier main game wagering as well as side or proposition bets.

In one embodiment the game is a card game which offers an ante, a secondary, a tertiary and a quaternary wagering option on a player hand against a dealer hand, as well as one or more optional side or proposition bets. The game may comprise a card game in which one or more initial cards are dealt to each player and the dealer and then then community flop, river and turn cards are dealt, with each player and the dealer forming a best five card poker hand from their initial cards and the community cards.

In one embodiment of a method, a player places an ante wager and, optionally, one or more optional bets. Two initial cards are dealt to each player and the dealer. The player then elects to fold or place a secondary wager. Three initial community or "flop" cards are then dealt or displayed. The player then elects to fold or place a tertiary wager. Two additional community cards, a "river" and a "turn" card, are then dealt or displayed. The player then elects to fold or place a quaternary wager.

If the player is active, e.g. has placed the required ante, secondary, tertiary and quaternary wagers, then the outcome of those wagers is determined by comparing the player's hand to the dealer's hand. The player's hand may comprise the best five card poker hand formed from the initial two cards dealt to the player and the five community cards. The dealer's hand likewise is formed from the initial two cards dealt to the dealer and the community cards.

In one embodiment, if the player's hand comprises a Full House poker hand or better and beats the dealer's hand, the player is paid winnings on their secondary, tertiary and quaternary wagers. If the player's hand is less than a Full House but beats the dealer's hand, or if the player's hand has a rank of a Full House or greater and is equal in rank to the dealer's hand, the outcome is a push (the player's wagers are returned) and if the player's hand loses, the player loses their secondary, tertiary and quaternary wagers.

In one embodiment, if the player's hand has a rank of at least a Full House and outranks the dealer's hand, then the player wins their ante wager and is paid winnings. If the player's hand beats the dealer' hand but has a rank of less than a Full House, then the player's ante wager pushes. In all other cases, the player loses their ante wager.

Preferably, regardless of whether the player was active and/or the outcome of the main game wagers, the optional bets are resolved. In one embodiment, a player hand proposition bet, a dealer hand proposition bet and a Pair side bet are offered. The player wins the player hand proposition bet if the player's hand comprises at least a Three of a Kind and wins the dealer hand proposition bet if the dealer's hand comprises at least a Three of a Kind. The player wins the Pair side bet if the player's initial two deal cards comprise a Pair.

Winnings may be paid for winning wagers and winning proposition/side bets, such as based up a pay table. In a preferred embodiment, however, one or more winning wagers or bets are paid based upon a secondary event, such as a wheel spin. The wheel spin may offer the player the potential for varying awards for their winning wager or bet, including a jackpot.

Another aspect of the invention is a unique gaming table for presenting the game of the invention. The table may display a gaming table layout which includes a dealer station and player positions, input receiving devices, such as for receiving or detecting the placement of wagers and player inputs such as wheel spin inputs, and one or more electronic video displays, such as for displaying wheel spin events and other game information.

Yet another embodiment of the invention comprises a method and system for presenting a game, such as a table game having a base portion and at least one side bet feature, where a single combined wager is received and allocated to an ante required for the base portion of the game and to a side bet required to the side bet feature of the game.

In one embodiment, a method of presenting a game comprising the steps of: providing a gaming table comprising: a table controller; a playing surface; and a game layout, the game layout comprising a first betting location having a first wager input sensor connected to the table controller; receiving a combined wager at the first betting location by sensing at least one wagering chip at the first wager input sensor; registering, via the table controller, the combined wager; allocating, via the table controller, a portion of the combined wager to an ante to play the base game and a remaining portion of the combined wager to at least one side bet required to participate in the at least one side bet feature; utilizing one or more game pieces to present the game; determining an outcome of the game with reference to one or more of the game pieces and awarding first winnings to the player for a winning outcome of the game; and determining an outcome of the at least one side bet feature with reference to one or more of the game pieces and awarding second winnings to the player for a winning outcome of the at least one side bet feature.

In one embodiment, a game table wagering system comprises: a gaming table, the gaming table comprising: a playing surface supported by a supporting structure; and a game layout, the game layout comprising a first betting location a first wager input sensor associated with the first betting location; a table controller, the table controller comprising a processor, a memory, and machine-readable code stored in the memory and configured, when executed by the processor, to the processor to: register, in response to a signal from the first wager input sensor of a wager at the first betting location, a combined wager; and allocate a portion of the combined wager to an ante to play a base portion of a game and a remaining portion of the combined wager to at least one side bet required to participate in at least one side bet feature of the game.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods of playing and presenting games. One embodiment of the invention comprises a game, and preferably a card game, which offers multiple wagering opportunities to a player, thus increasing the stakes and excitement of the game.

In a preferred embodiment, the methods of game play and presentation are implemented relative to a gaming table.

Figure 1:
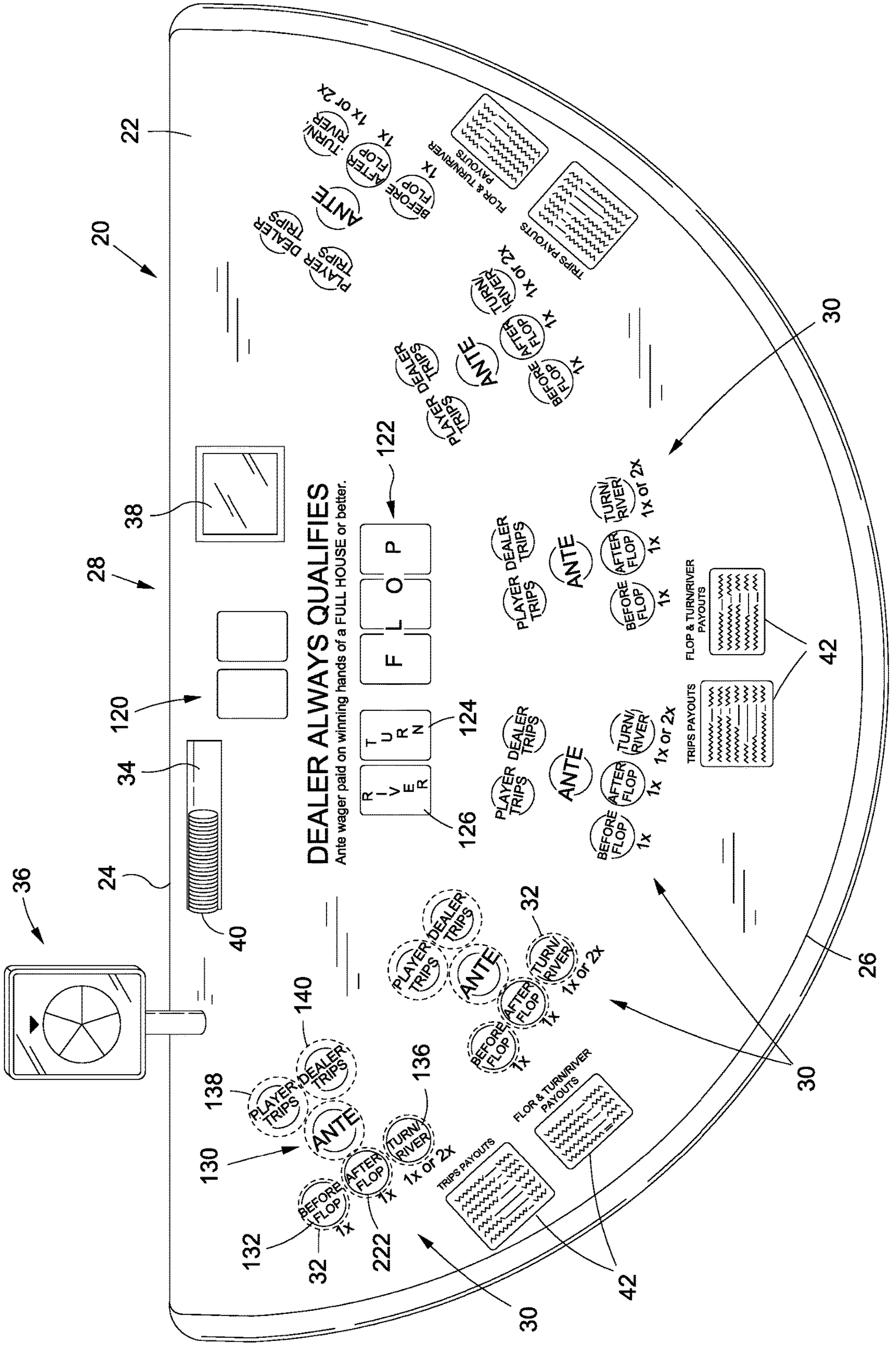
FIG. 1 illustrates one embodiment of a game table and associated game layout for playing and presenting a game of the invention.

One embodiment of a gaming table in accordance with the invention will be described with reference to FIG. 1. As illustrated in FIG. 1, a game playing surface, such as a gaming table 20, is provided. The gaming table 20 defines a top or playing surface 22. The gaming table 20 may include one or more supports, such as a base, legs or the like (not shown) via which the playing surface 22 is elevated above a supporting surface such as a gaming floor.

The shape of the playing surface 22 may vary. In one embodiment, the gaming table 20 has a rear having a rear edge 24 which is generally straight and has an opposing front having a front edge 26 which is generally arcuate. A bumper or cushion may be located at either or both edges 24,26.

In one embodiment, the playing surface 22 is generally planar. However, the playing surface 22 could have one or more raised areas and/or one or more depressed areas or other features which are integrated into the table or added to the table, such as by being located on or mounted to the top surface thereof. Various game-related information or features are preferably associated with the gaming table 20. In one embodiment, the playing surface 22 comprises a gaming felt or similar element(s) which are located over a substrate, such as a planar support. The gaming felt may bear game play information or other information, such as by printing on the felt. This information may vary, such as depending upon the game or games which are to be implemented at the gaming table 20. For example, as indicated above, printing on the gaming felt may comprise one or more pay tables 42, card locations and the like.

In one embodiment, the configuration of the gaming table 20, such as via elements which are associated with the table 20 and information printed on the gaming felt, defines a dealer station 28 where a dealer may run a game, and one or more player positions 30. The dealer station 28 is generally located at the rear edge 24 and the player positions 30 are located opposite the dealer station 28 at the front or front edge 26. The dealer may, for example, stand at the rear of the table adjacent to the dealer station 28. A player may stand or sit adjacent to each player position 30 at the front of the gaming table 20.

In one embodiment, the game which is presented at the gaming table 20 comprises a wagering game. Wagers may be placed using physical gaming chips or other elements. In one embodiment, wagers by players may be sensed by detecting the association of one or gaming chips (or monies or other wagering implements) with one or more input receiving devices or input sensors 32. The input receiving devices or input sensors 32 might comprise buttons (wired or wireless), or other input devices, but preferably comprise proximity sensors. The input receiving devices 32 may be located in or on the gaming table 20 and are configured to detect inputs, such as provided by players at the playing surface 22. In the case of proximity sensors, the sensors may be any type of proximity sensor now known or later developed, such as IR, acoustic, capacitive, or the like. In other embodiments, other types of sensors might be utilized, such as RFID or the like. For example, the input receiving devices 32 might comprise capacitive type sensors such as Lanbao CR30S series capacitive sensors (produced by Shanghai Lanbao Sensing Technology Co.; www.shlanbao.com), which sensors behave as standard electrical 4-pin switches where the switch status changes when a chip (or other object, such as a player's hand) is placed on it. In another embodiment, the input receiving devices or sensors 32 might comprise a light sensing device which measures the distance between the sensor and a chip (or other object, such as a player's hand), such as the VL6180X ambient light sensing proximity sensor produced by STMICRO (www.st.com).

In one embodiment, one or more input receiving devices 32 are associated with each player position 30, thereby providing a means for each player to provide input relative to game play at the gaming table.

In one embodiment, the dealer station 28 may include one or more chip trays 34 which are located on or at the gaming table 20 for storing chips 40 which may be used to pay player winnings and/or in which chips which were used by players to place wagers may be collected.

In one embodiment, the gaming table 20 may include a number of other features. For example, the gaming table 20 may include one or more table displays 36. The table display 36 may comprise an electronic video display (such as an LCD, LED, OLED, DLP or other types of displays which are now known or later developed) or might even comprise a mechanical and/or electro-mechanical display device such as one or more spinning wheels or reels. The table display 36 may be located at or near the gaming table 20 for use in displaying game related information such as pay table information, game status information, game outcome information, bonus information or the like. The table display 36 might also be used to display promotional information or advertising.

The gaming table 20 might also comprise or include various input devices and/or other display devices. The input devices might include one or more dealer input devices such as one or more buttons or a dealer touchscreen display 38. For example, the dealer display 38 might comprise a display which displays game-related information to the dealer and allows the dealer to provide various inputs. Of course, various other types of input and display devices might be associated with the gaming table 20. The gaming table 20 might also include player touch-screens, inputs buttons or the like.

Additional details of a gaming table in accordance with one embodiment of the invention will be described with reference to FIG. 2. As illustrated, in this embodiment, elements of the gaming table 20 are associated with or connected to at least one table controller 100. The table controller 100 may be located at the gaming table 20 or may be remote therefrom.

In one embodiment, the table controller 100 comprises at least one processor 102 which is configured to execute machine readable code fixed in a tangible medium (e.g. "software"). The table controller 100 may also comprise one or more information or data storage devices 104. These data storage devices 104 may comprise any type of data storage device such as ROM, RAM, EPROM or the like, as well as mass storage devices such as hard drives. The data storage devices 104 may store various data, including game code or software which is executable by the processor(s) 102 and other data, such as game data including wager data, game outcome data, images, etc.

The table controller 100 preferably includes one or more communication interfaces 106. The communication interface(s) 106 may facilitate wireless and/or wired communications with one or more remote systems or devices in accordance with various protocols (USB, Wi-Fi, Bluetooth, Ethernet, Firewire, etc.). In one embodiment, data or information may be exchanged between the processor(s) 102, data storage device(s) 104 and communication interface(s) 106 via one or more interfaces, such as a system bus 108. Of course, the table controller 100 might have other configurations, including other elements or features.

Figure 2:
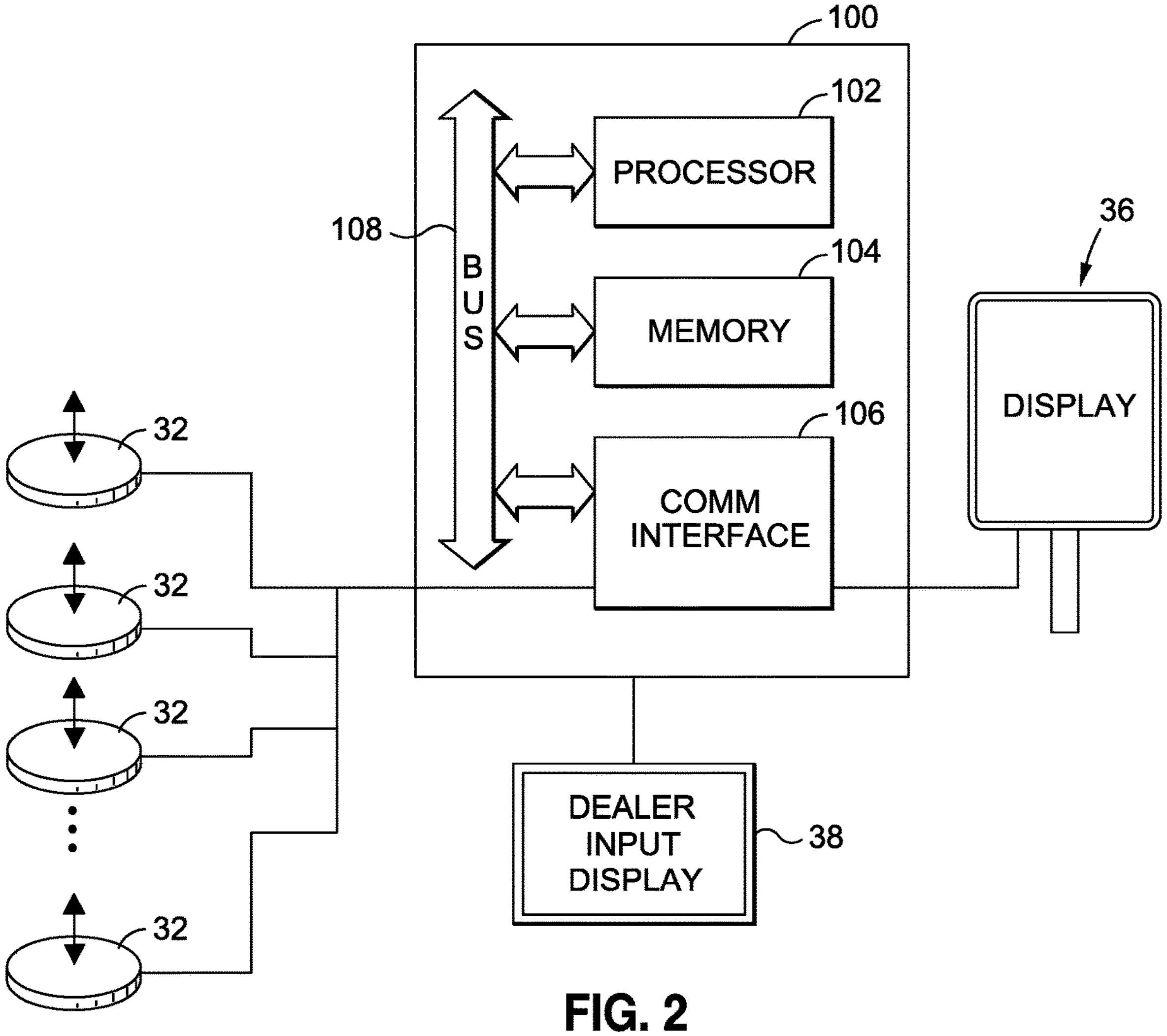
FIG. 2 illustrates a gaming system in accordance with one embodiment of the invention.

As illustrated in FIG. 2, the one or more input receiving devices 32 of the gaming table 20 may be interfaced with the table controller 100 to that the table controller 100 may receive information from those devices 32 and, in some embodiments, to transmit information to those devices. Likewise, the dealer input and/or display devices, such as the dealer touchscreen 38, may be interfaced to the table controller 100. Also, other input and/or display devices such as the table display 36 may be interfaced to the table controller 100.

In one embodiment, the table controller 100 or other devices associated with the gaming table 20 may determine player monetary or chip value balances, including based upon monies associated with the table by the player (such as chips purchased), amounts wagered and amounts won or the like.

The gaming table 20 of the invention may include or be associated with other elements or devices. For example, the gaming table 20 might include other gaming equipment, such as one or more player displays (such as located at each player position and configured to display game information, player tracking information, advertising or other information), card shoe(s), card reader(s), card shuffler(s), player tracking devices (such as for reading a player tracking card or other media of a player for use in tracking the player's game play) and the like. The gaming table 20 might also be connected to external devices. For example, the table controller 100 might be connected to one or more casino servers or systems, such as a casino accounting server which tracks game play at each gaming table 20, such as relative to the amounts of wagers placed and winnings paid to the players, among other information. The gaming table 20 might also be connected to a player tracking server and include player tracking elements such as player card readers.

The gaming system might include other elements, such as input receiving device controllers or the like. In one embodiment, the input receiving devices 32 communicate with a hub or aggregator 110 which communicates with the table controller 100. The hub 110 may be configured to read or determine the status of each input receiving device 32 and provide information to the table controller 100, such as when the status of an input receiving device 32 changes. The hub 110 may also comprise a power source for the input receiving devices 100. As another example, a proximity-type input sensor might be configured as a USB type device having a USB controller. The table controller 100 may be configured to control the proximity device as a USB device. In this regard, the processor 102 and/or one or more sub-processors or controllers may be utilized to control the input receiving devices.

In one embodiment of the invention, different input devices might be utilized for receiving different inputs (such as one input device for receiving a wager input and another input device for receiving a "spin" input or the like). In another embodiment, the one or more input receiving devices 32 are configured to receive multiple inputs. Each input receiving device 32 may be configured to receive two or more inputs. The inputs may be game-related inputs by a player and comprise two or more different types of inputs at two or more different times.

In one or more embodiments of the invention, aspects of the input receiving devices 32 and/or other devices or elements may be controlled or utilized to facilitate the receipt of the different player inputs. For example, the input receiving devices 32 and/or the table controller 100 may be configured to control the receipt of inputs, such as by selectively activating and deactivating the input receiving devices 32 so that they will receive input at certain times, but not others. In other embodiments of the invention described below, the configuration of the input receiving devices 32 may change to facilitate the input(s), such as by changing a detecting sensitivity to detect an intended player input from an unintended input. In yet other embodiments described herein, one or more secondary elements, such as audible and/or visual indicators may be used in conjunction with the input receiving devices 32 to facilitate the input receiving functionality of the input receiving devices 32.

In one example embodiment of the invention, such as disclosed in more detail below, a wagering game may be presented at the gaming table 20. The game may have a base game portion and a secondary or bonus game portion. For example, the base game portion may comprise a card game which is played with one or more decks of physical playing cards. The bonus game might comprise a bonus wheel spin for a potential bonus award. As detailed herein, however, other types or configurations of games which require player input may be implemented relative to the invention.

In one embodiment, the input receiving devices 32 may be turned off or be configured to not receive inputs except during designated times. This prevents, for example, inadvertent inputs from being received when games are not being presented or when other activities are occurring. For example, it may be preferable for the input receiving devices 32 to not receive inputs between games or during certain portions of a game.

In one embodiment, the input receiving devices 32 may be turned off by providing an instruction to them to not receive or transmit inputs. In other embodiments, the table controller 100 could be configured to ignore input signals from the input receiving devices 32.

In one embodiment, the input receiving devices 32 may be "activated", such as by turning them on or by causing the table controller 100 to be configured to receive inputs from the input receiving devices 32. This step may be implemented by a dealer, such as by input to the one or more dealer input devices. For example, the dealer display 38 might display a "start game/receive wagers" button which the dealer may select. In response to that input, the table controller 100 may be configured to receive inputs from the input receiving devices 32 or may send control instructions to those devices to cause them to be activated.

After activation, one or more first inputs may be provided to the one or more input receiving devices 32. This may comprise, for example, a first type of input such as a wager input, such as via the detection of one or more chips.

In one embodiment, each player who wishes to play the game may be required to place one or more wagers. The player might optionally be permitted to place other wagers. For example, a player might be required to place one or more base wagers to play the game and might be permitted to optionally place a bonus wager. In one embodiment, one or more input receiving devices 32 are associated with each player position 30. More than one input receiving device 32 may be provided relative to each player, such as for receiving a base wager and a bonus wager.

Figure 3A:
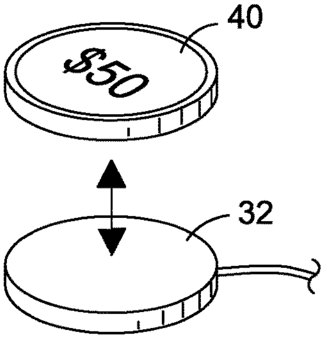
FIGS. 3A and 3B illustrate first and second inputs to an input receiving device in accordance with the present invention.

In one embodiment, a wager input may be provided by a player placing one or more chips 40 on or adjacent to a particular input receiving device 32, such as illustrated in FIG. 3A. At that time, the wager input(s) may be detected by those devices 32 and may be transmitted to the table controller 100 for processing. Wager information may be displayed to the dealer, such as via the dealer display 38. The dealer might then collect the wagers and place the wagered chips in the chip tray 34.

In one embodiment, after a first input period, the input receiving devices 32 may again be de-activated. Once again, this may comprise a dealer providing input to the dealer input device(s), such as the dealer touchscreen 38. For example, the dealer touchscreen 38 might display a "close wager" button which the dealer may select. This may cause the table controller 100 to no longer receive inputs from the input receiving devices 32 and/or to send a control instruction to those devices to de-activate them.

At one or more times, the input receiving devices 32 may be configured to receive one or more additional or second inputs. Such a secondary input might comprise a secondary or other additional wager. One or more of the secondary inputs may comprise a different type of input than the first input. In order to receive the at least one secondary input, the input receiving devices 32 may again be re-activated. In one embodiment, only certain input receiving devices 32 may be activated for receiving particular inputs. For example, a player who placed a bonus wager and received a certain bonus-triggering result from the play of a base game might be permitted to participate in a bonus event, such as a bonus wheel spin. As described below, in another embodiment, a player might be entitled to spin award wheel which selects or reveals one or more awards, such as an award for a winning bet. Preferably, the input receiving devices 32 corresponding to only those players who are entitled to participate in the bonus event, award event or the like might be activated. The input receiving devices 32 relative to the other players preferably remain inactive, such as to prevent accidental input thereto.

Figure 3B:
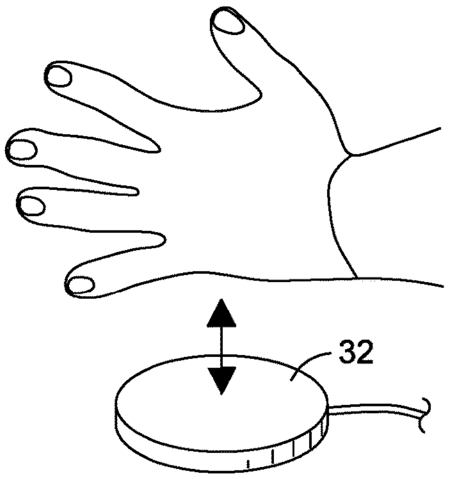

In one embodiment, an input might comprise a player placing their hand, one or more fingers or another body part or the like on or adjacent to the input receiving device 32, or waving their hand across the device, such as illustrated in FIG. 3B (for example, using the above-referenced VL6180X ambient light sensing sensor, the sensor detects the presence of the player's hand proximate to the sensor (by determining a distance of the player's hand from the sensor by determining a flight time of projected light which is reflected from the player's hand back to the sensor) in order to receive the player's hand input). In response, one or more game features or the like may be implemented by the table controller 100 and/or dealer in response to the received input. For example, in response to the detection of a player's hand, an input receiving device 32 may send a signal to the table controller 100. The table controller 100 may then be configured to cause the table display 36 to display the image of a wheel which rotates and then stops at a selected award or bonus location, such as illustrated in FIG. 1. The bonus spin outcome or award selection event may result in the player being awarded a bonus win or a selected award. Of course, this process might be repeated relative to each player who is entitled to a bonus spin or award selection event. In one embodiment, the input receiving device 32 corresponding to a first player is activated and receives an input from that player, the bonus element or other feature is implemented and then that input receiving device 32 may be inactivated. The input receiving device 32 relative to a second player may then be activated, and so on.

Figure 4:
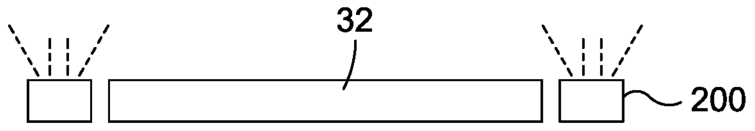
FIG. 4 illustrates an input receiving device having an associated indicator in accordance with one embodiment of the invention.

In one embodiment, the system might include one or more input receiving device indicators. These indicators might comprise, for example, audible and/or visual indicators. The indicators may provide an indication, such as by sound, light (including color), text or the like, of a status of an input receiving device 32 or an activity associated therewith. As one example, a visual indicator such as a color or multi-color light ring 200 might be located around an input receiving device, such as illustrated in FIG. 4. Of course, such an indicator might otherwise be located adjacent to an input receiving device 32 or even over such a device. The indicator lights might be located inside the device if the device is equipped with a translucent surface.

In one embodiment, the indicator(s) might provide an indication or information to a user comprising one or more of: (1) an inactive status of the input receiving device; (2) an active or ready for input status of the input receiving device; and (3) accepted or received input to the input receiving device. In one embodiment, the one or more indicator(s) are controlled in conjunction with the input receiving devices, such as via the table controller.

As one example, when an input receiving device is inactivate, an associated indicator (such as a light ring around the input receiving device) might be illuminated red. When it is active, and ready for a particular input, it might be illuminated flashing green. When an input is received, the flashing green light might transition to a steady green light.

Figure 5A:
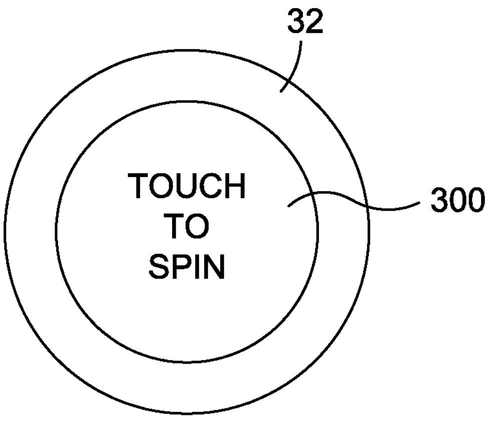
FIGS. 5A and 5B illustrate an input receiving device having an associated indicator in accordance with another embodiment of the invention.
Figure 5B:
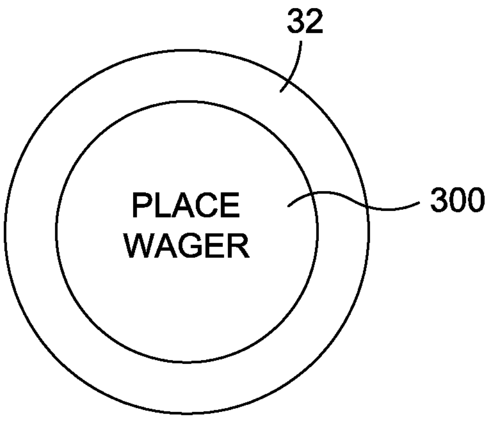

In another embodiment, text or other instructions might be displayed by the one or more associated indicators. For example, as illustrated in FIGS. 5A and 5B, a video screen 300 may be located over or may be located adjacent to an input receiving device 32. The video screen 300 might display "place wager" when the input receiving device is configured to receive a wager (as shown in FIG. 5B) and might display "touch to spin" or other instructions when the input receiving device is configured to receive a player spin input (as shown in FIG. 5A).

Of course, the indicator(s) may have various configurations. Preferably, the indicator(s) are located adjacent to or are associated with (and may even be integrated with) the input receiving device(s) 32.

As one example of the use of an input device where one or more indicators are utilized, an indicator associated with an input receiving device or sensor 32 may be activated to indicate to a player that their input receiving device 32 is ready to accept a wager. This might comprise, as indicated above, causing the indicator to illuminate a flashing green light, to cause a display to show a "place wager" instruction or the like. The input receiving device 32 may then receive an input in the form of one or more chips placed by the player.

The indicators may then be activated to indicate that the wager period is closed. This might comprise, for example, the indicators being illuminated red or displaying a "wagers closed" instruction or the like. Thereafter, such as after various steps of the game, an indicator may be activated to indicate that an associated input receiving device or sensor 32 is ready for a bonus spin input. This may comprise the indicator illuminating a flashing green light, showing a "touch to spin" instruction or the like, as illustrated in FIG. 5A.

In one embodiment, the indicator may be activated to indicate that the input was received from the player. For example, once the input receiving device 32 detected the player input and sent information regarding this input to the table controller 100, the table controller 100 may cause the indicator display a steady green light or to display an "input received" indication. Thereafter, the game feature might then be implemented based upon the player input.

Of course, at a gaming table where multiple players are playing, the indicators may indicate a particular status of an input receiving device corresponding to each player, where the status may vary from player to player. This allows the indicators to provide information to each player which is unique to that player. For example, during a bonus spin or award selection event phase, only the indicator associated with the input receiving device of a player whose turn it is to spin may indicate such (while the indicators associated with the input receiving devices of the other players may indicate that no input is to be provided by those players).

Of course, the indicators may be used in various manners. For example, the indicators might always be activated in a manner which confirms a player input, whether of a wager or a direct input, rather than just a player's direct input. In one embodiment, the status of the indicators may be automatically controlled by the table controller 100 or might be controlled by the dealer, or both. For example, a dealer might provide input which opens and closes a wagering period. When the dealer opens the wagering period, the indicators (via control from the table controller based upon the dealer's input) might indicate that the input receiving devices 32 are ready to receive wagers and when the dealer closes the wagering, the indicators may indicate that no more wagering inputs are being accepted (again as controlled from the table controller based upon the dealer's input).

As indicated herein, in one embodiment, input receiving device(s) 32 may move between active and inactive conditions. While the dealer may provide inputs to the table controller 100 to control input receiving device activation and de-activation, such might be at least partially automated. For example, in response to a dealer selecting a "start game" option, the table controller 100 might activate the input receiving devices 32 for purposes of receiving player wagers. The table controller 100 might automatically close wagering after a certain time, such as 1 minute, by automatically de-activating them.

In another embodiment of the invention, the input receiving device(s) 32 might always be active or might be inactive between games but always active during game play. In this embodiment, in order to reduce chance of inadvertent input to the input receiving devices(s), the indicators described above might be utilized. For example, instead of an input receiving device being truly inactivated, the associated indicator may indicate to a player that they should not provide an input to the device (although if the player did, such an inadvertent input might then still be registered).

In one embodiment, the input receiving device(s) 32 may be controlled to change one or more characteristics thereof, such as a sensitivity of the device. As one example, the table controller 100 or another controller might be used to implement a first input sensitivity of an input receiving device, such as relative to the detection of one or more chips, but another or second input sensitivity at another times. For example, an input sensitivity or similar characteristic might be controlled in order to reduce the chances for inadvertent input to the input receiving device 32, such a player's hand inadvertently passing over or near the device. This feature might be used, for example, to distinguish between a true "spin" input (or other input from the player) which is provided by a player's hand or the like, and an inadvertent passing of a portion of the player's hand or another object near the sensor which is not intended as an input. As another example, the input receiving device 32 might be configured to require an input of a length of time, such via detection of a player's hand adjacent to the input receiving device(s) for a period of time which would essentially avoid in inadvertent input from being logged. This type of input receiving device control, particularly relative to a proximity sensor, has particular applicability to the invention where the game may require multiple inputs from a player, including different types of inputs, during different times of the game.

In one embodiment, the table 20 defines one or more game play features. Such features may be defined by printing on the table or its covering surface, by one or more displays and/or by surface or topographical features such as depressed areas, raised areas, contours or the like.

In one embodiment relative to the game described below, the dealer station 28 defines a dealer initial card area 120, a flop card area 122, a turn card area 124 and a river card area 126. These areas may be defined by printing, raised or depressed areas or the like, as detailed above.

Each player position 30 preferably defines an ante wager area 130, a secondary wagering area 132, a tertiary wagering area 134, a quaternary wager area 136, and first and second proposition bet areas 138,140, such as player hand and dealer hand trips bets areas. Each player position 30 might also include one or more side bet areas, such as for the Pair side bet described herein. Each player position 30 might also comprise an initial card area (not shown), such as to which the player's initial game pieces/cards may be dealt.

The table may include other areas or information, such as other card areas, pay tables, instructions and the like. This information might be printed on the table 20 or might be displayed in other manners, such as via one or more electronic displays.

Additional details of methods, devices and systems of the invention will now be described. Another aspect of the invention comprise a method of presenting and playing a game. In one embodiment, the game is played between one or more players and a dealer or the house. In one example embodiment of the invention, the method may be implemented relative to a gaming table. The gaming table might comprise the gaming table 20 described above, such as including the various input receiving devices 32, table display 36 and other features, or it might comprise a gaming table which does not include some or all of such features, or might include other features.

Figure 6:
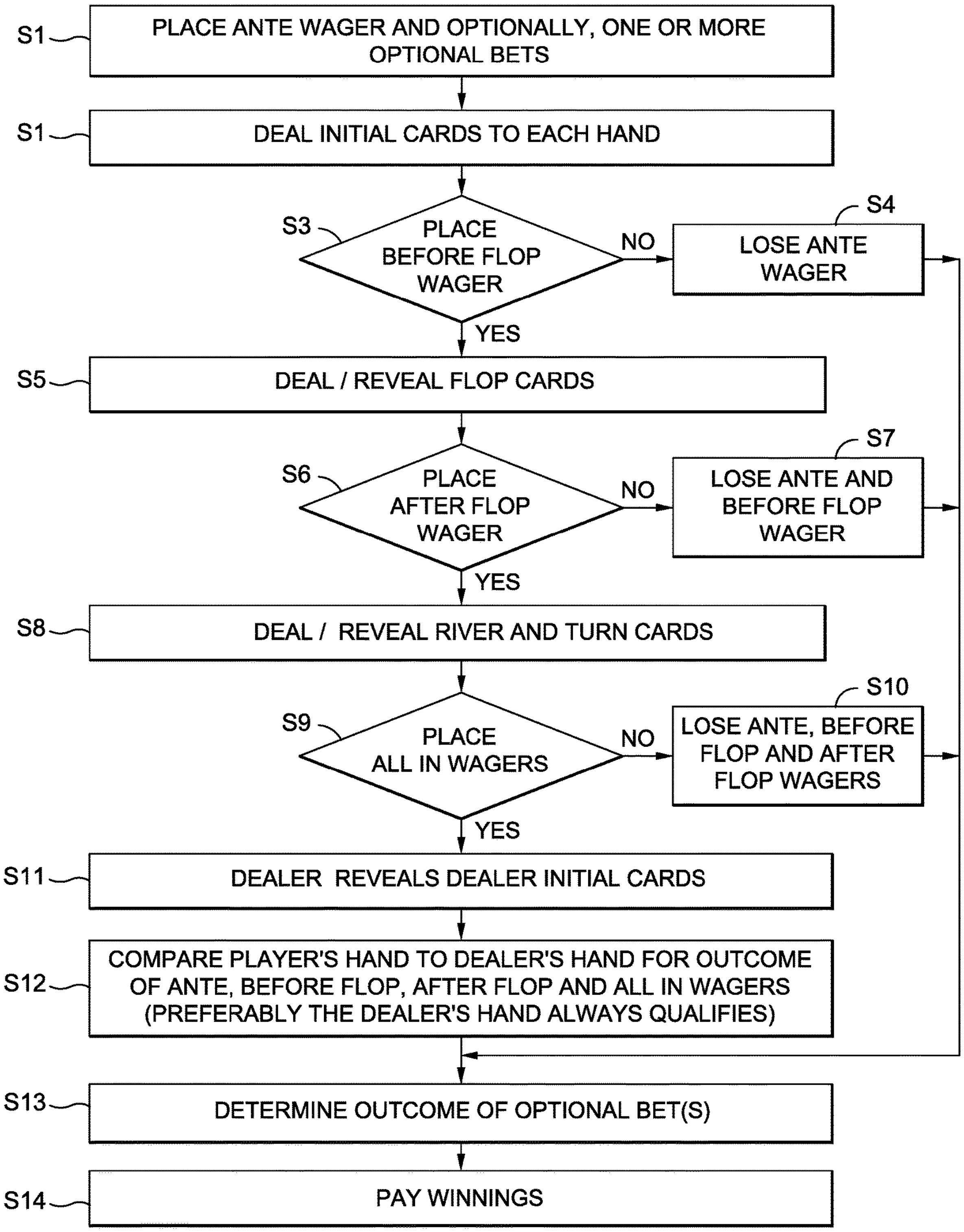
FIG. 6 is a flow chart which illustrates one method of playing and/or presenting a game in accordance with the invention.

FIG. 6 is a flow diagram which illustrates a method of presenting and playing a game in accordance with one embodiment of the invention. In one embodiment, the game is played by a dealer or the house (which may comprise a live person or a virtual dealer) and one or more players. As detailed herein, the game might be played or presented at a gaming machine or device, at a gaming table or the like. In a preferred embodiment, the game is played at a gaming table by a dealer and at least one player, such as up to 6 or 8 players or more.

Preferably, the game is presented as a wagering game in which a player is required to place a wager in order to play the game and where the player has the opportunity to be awarded winnings. Thus, in one embodiment, in a step S1, a player places an ante or initial wager in order to participate in the game. As indicated above, the game table 20 may include an ante wager location 130 at which a player may place their ante wager. An input sensor 32 may be associated with the location for detecting a wager. In one embodiment, a player places one or more chips, coins or the like at the wager location(s), such as by locating the one or more chips or the like in proximity to the one or more sensors for detection thereby. The ante wager may be required to be of a certain minimum size and may also have a maximum size.

Optionally, a participating player may place one or more optional bets. These may comprise or be referred to by various names, such as proposition, side and/or bonus bets. For example, the one or more optional bets might comprise, for example, a player hand and/or dealer hand "trips" bet, such as made via corresponding wager locations 138,140 at the game table 20. The player hand and/or dealer hand trips bets may comprise proposition bets that a player or dealer hand will comprise a hand having certain characteristics. In one embodiment, this may comprise that the player or dealer hand comprises at least a minimum of a Three of a Kind poker hand in a poker style game. Of course, other characteristics might be defined, such as one characteristic for the player hand and a different one for the dealer hand. Thus, while the player hand and dealer hand proposition bets are referred to herein as "trips" bets because they are based upon those hands comprising a Three of a Kind, they might be referred to simply as bets or proposition bets, such as in situation where other winning criteria are utilized. As with the ante wager, the player hand and/or dealer hand trips bets might be a minimum amount and/or maximum amount. In one embodiment, a player may place a player hand trips bet, a dealer hand trips bet, or both. In other embodiments, a player might only be permitted to place a player hand trips bet or a dealer hand trips bet, but not both.

Alternatively, or in addition, a player might optionally place one or more bonus or side bets. As described below, such a bet might comprise a Pair bet that the first two cards dealt to the player comprise a Pair (e.g. two cards of the same rank).

In a step S2, one or more initial game or playing pieces are provided to each player and the dealer. In a preferred embodiment, the game is played with playing cards, such as cards dealt from one of more decks of standard playing cards (e.g. cards having the rank indicia 2 3, 4, 5, 6, 7, 8, 9, 10, Jack, Queen, King and Ace in each of the four suits Hearts, Clubs, Spades and Diamonds). Of course, other playing pieces might be utilized such as dice, etc. As described below, the playing pieces may comprise physical playing pieces, such as physical printed cards (such as where card indicia is printed on physical card stock, with the card indicia displayed on one side—a "face" side—of the card and not on an opposing side or "card back"), physical dice or the like, or might comprise virtual playing pieces, such as graphical images of the playing pieces displayed on one or more electronic video displays.

In one embodiment, in a step S2 two playing cards are dealt to each player and the dealer. Preferably, at least the dealer cards are dealt face down (e.g. the card indicia are not visible to the players).

In a step S3, each player inspects their initial cards and elects to either place a secondary wager, which may be referred to as a "Before Flop" wager, or fold. If the player folds (e.g. does not place the required secondary wager), then the player loses their ante wager but is still entitled to participate in any placed optional bet(s), as indicated in steps S4 and S13. The secondary wager may be placed at a secondary wager location 132. Again, this input may be detected by an associated input receiving device 32. The secondary wager may have a certain minimum size, such as comprising a secondary wager equal to the player's ante wager. The secondary wager may also have a maximum size.

In a step S5, one or more additional game pieces are dealt or revealed. In one embodiment, the additional game pieces may comprise three additional playing cards, referred to as the "flop cards." These cards may be displayed to all players and the dealer (and may thus be referred to as community cards) and are preferably dealt or provided from the same deck or decks of cards as the initial cards. Preferably, the value of the playing pieces is revealed, such as by dealing the playing cards face up.

In a step S6, each player who has not already folded must elect to either place a tertiary wager or fold. If the player folds (e.g. does not place the required tertiary wager), then the player preferably loses or forfeits their ante and secondary (before flop) wagers, as in step S7. However, the player remains eligible to participate in any placed optional bet(s), as in step S13. The tertiary wage may be placed at tertiary wagering location 134 and may be detected by an associated input receiving device 32. The tertiary wager, which may be referred to as an "after flop" wager, may have a certain minimum size, such as comprising a tertiary wager equal or larger than the player's ante wager. In certain embodiments, the tertiary wager may also have a maximum size.

In a step S8, one or more additional game or playing pieces are revealed or provided. In one embodiment, this step comprises dealing and revealing two additional playing cards. These cards may be referred to as the "turn" and "river" cards. Preferably, these cards are displayed to all players and the dealer (and may thus also be referred to as community cards) and are preferably dealt or provided from the same deck or decks of cards as the other cards. Preferably, the value of the playing pieces is revealed, such as by dealing the playing cards face up.

In a step S9, each player who has not already folded inspects their initial cards in combination with the additionally dealt cards (or other game pieces) and makes an election to place a quaternary wager, such as an "all in" wager. Once again, if the player folds (e.g. does not place the required quaternary wager), then the player preferably loses or forfeits their ante, secondary (before flop) and tertiary (after flop) wagers, as in step S10. Once again, however, the player may remain eligible to participate in any placed optional bet(s), as in step S13. The quaternary wager may be placed at a quaternary wager location 136 and detected by an associated input receiving device 32. The quaternary wager, may have a certain minimum size, such as 1 or 2 times their ante wager (and the wage might have a maximum size).

In a step S11, the dealer reveals the dealer's initial card(s) or game piece(s). For example, in the case of playing cards, the dealer may turn over their initial cards so that the card faces which display the card indicia are displayed to the players.

In a step S12, each active player's hand is compared to the dealer's hand of game pieces. In one embodiment, this step applies to active players, e.g. those players that placed all required wagers, e.g. the ante wager, the secondary wager, the tertiary wager and the quaternary wager. The player and dealer hands may be formed in various manners. In a preferred embodiment, each active player and the dealer have been dealt two initial playing cards and can utilize any of the five community cards (the three flop cards and the turn and river cards), or seven total cards. In the preferred embodiment, each player and the dealer preferably forms a best five card poker hand from the seven available cards, such as in accordance with standard poker hand rankings (ranked from low to high, the hands of: High Card, One Pair, Two Pair, Three of a Kind, Straight, Flush, Full House, Four of a Kind, Straight Flush) or other defined criteria for the same.

In this step S12, each active player's hand is compared to the dealer's hand, such as to determine which hand (e.g. the player's hand or the dealer's hand) has the highest rank. In one embodiment, the hand with the highest rank is determined to be the winner. Tie hands may be declared a push. In a preferred embodiment, the dealer hand always qualifies. In other words, regardless of the ranking of the dealer's hand (even when the dealer's hand has a low ranking), the player's hand is compared to the dealer's hand in the evaluation of the player's wagers.

In a step S13, the player and/or dealer hands (or other game pieces) are evaluated for the optional bets. In one embodiment, for each player who placed a player hand trips bet, this comprises determining if the player's hand comprises at least a Three of a Kind poker hand. In the case of each player who placed a dealer hand trips bet, this comprises determining if the dealer's hand comprises at least a Three of a Kind poker hand.

In a step S14, winnings are preferably paid for winning wagers and bets (and wagers or bets or returned or collected). For example, for each active player, their ante wager is paid at 1:1 (e.g. if the player's ante wager is $5, then the player's ante wager would be returned along with a payout of $5) if their hand is winning and comprises a Full House or better. Other winning player hands result in a return of the player's ante wager (e.g. a "push"), but no award of winnings. If the player's hand does not beat the dealer's hand, then the player's hand is losing and the player loses their ante wager (e.g. no winnings are paid).

In one embodiment, each active player's secondary, tertiary and quaternary wagers (such as Before Flop, After Flop and All In wagers) may be paid out at the following rates (according to this structure, a player must have a winning hand of at least a Full House in order to be awarded winnings on these wagers, and must have a winning hand in order to have these wagers be declared a push; otherwise, the player loses theses wagers):

TABLE 1

| Secondary/Tertiary/Quaternary Wager Payouts | |
|---|---|
| Winning Hand | Pays |
| Royal Flush | 100 to 1 |
| Straight Flush | 20 to 1 |
| Four of a Kind | 4 to 1 |
| Full House | 3 to 2 |
| All Other Wins | 1 to 1 |

If the player's hand does not beat the dealer's hand, then the player preferably loses their secondary, tertiary and quaternary wagers (e.g. no winnings are paid). If the player's hand is equal in rank to the dealer's hand, the player's wagers are returned (e.g. a push), but no winnings are awarded.

In one embodiment, winnings are paid to each player who placed a winning optional bet, regardless of whether the player's hand bet the dealer's hand. In one embodiment, winnings may be paid for a player's winning player hand proposition bet or winning dealer hand proposition bet based upon the hand rank as follows:

TABLE 2

| Proposition Bet Payouts | |
|---|---|
| Winning Player Hand or Dealer Hand Comprises: | Pays |
| Royal Flush | 50 to 1 |
| Straight Flush | 40 to 1 |
| Four of a Kind | 30 to 1 |
| Full House | 8 to 1 |
| Flush | 7 to 1 |
| Straight | 4 to 1 |
| Three of a Kind | 3 to 1 |

In one embodiment of the invention, winnings for one or more winning wagers or bets might be awarded in manners other than via pay table. For example, in the embodiment described above, a player is awarded winnings for their winning ante, secondary, tertiary and quaternary wagers and/or their trips proposition bets, are based upon one or more pay tables. In a preferred embodiment of the invention, the player is awarded winnings based upon an award selection event such as a spin of an award wheel.

For example, referring to FIG. 1, in one embodiment an award wheel may be displayed graphically on the display 36 at the gaming table 20. Each player who won their ante wager is given the opportunity to spin the wheel. As indicated above, in one embodiment, an input receiving device 32 may be activated. The player may then wave their hand or provide input to the input receiving device 32. The table controller 100 may then cause the display 36 to display a graphical representation of a spinning wheel which stops at a selected segment which corresponds to define the outcome of the wheel spin, and thus indicate the award which is awarded to the player.

In one embodiment, the input receiving devices 32 located at each participating player position may be activated in sequence. For example, six (6) players may be playing the game of the invention and only players in positions 1, 2 and 5 may have won their ante wager. In one embodiment, the dealer may indicate that it is time for those players to spin the award wheel to determine their awards. The input receiving device 32 corresponding to the player in position 1 might be activated first (such as by turning green, etc.) while the input receiving devices 32 at all other player locations may remain inactive. The player in position 1 may then provide input to their input receiving device 32, thus initiating the wheel spin event. Thereafter, the input receiving device 32 corresponding to the player in position 1 is de-activated and the one corresponding to the player in position 2 is activated, and so on.

In one embodiment, the virtual wheel may be configured with segments which have associated awards and the probability of a particular segment being selected may be weighted. In the wheel spin event, a random number generator or the like may be used to generate a random number which is then compared to a lookup table of outcomes. The selected outcome corresponds to a segment having an assigned award. The controller may then cause the display 36 to display a wheel spin in which the wheel stops at the selected segment. In this configuration, certain outcomes or awards are more likely to occur than others. Set forth below in Table 3 is one configuration for a virtual award wheel for the ante wager when the player has a Straight or better and their hand outranks the dealer's hand.

TABLE 3

| Ante Wager Bonus Spin: | | | |
|---|---|---|---|
| Number of Jackpots | Jackpot Amount | Community Amount | Wheel positions |
| 1 | $100,000.00 | | Jackpot (1 space) |
| 5 | $ 10,000.00 | | 1 |
| 100 | $ 5,000.00 | $100.00 | 3 |
| 50 | $ 1,000.00 | | 5 |
| 100 | $ 750.00 | | 8 |
| 1,800 | $ 500.00 | $ 50.00 | 6 |
| 4,500 | $ 100.00 | $ 15.00 | 9 |
| 2,544 | $ 75.00 | | 10 |
| 4,000 | $ 70.00 | | 11 |
| 7,000 | $ 65.00 | | 7 |
| 10,000 | $ 55.00 | | 4 |
| 19,900 | $ 50.00 | | 2 |

In this configuration, there are 50,000 potential outcomes and thus the odds of the jackpot amount being selected are 1:50,000 for a wheel spin. The odds of selecting a smaller award, such as $50.00, are much higher (19,900 out or 50,000). Notably, while the odds of receiving a smaller prize, such as the $50.00 prize, may be higher than that of certain larger prizes, the wheel may be configured to display fewer wheel segments having the lower prize amount (such as 2 segments which display the $50.00 award vs. 8 segments which display the $750.00 award), thus making the wheel appear to provide a higher chance of awarding a higher paying amount than comprise the true odds.

In this configuration, certain wheel spin outcomes also have an associated community amount or award, which amount may be paid to all or other players playing the game. In a preferred embodiment, the community award is paid to each player who placed an ante wager.

As indicated above, the game may include additional or other bets or wagers. In a preferred embodiment, the game includes an optional "Pair" side bet. This bet may be optional, but the player may be required to place the bet at the beginning of the game before any cards are dealt, such as at the same time as the player has the opportunity to place the optional proposition bets. In one embodiment, this side bet may be of a specific value, such as $5.00. Again, the player may place the bet, for example, associating a monetary value chip or the like with one of the input receiving devices 32, such as an input receiving device 32 at a Pair bet location.

In one embodiment, the game includes determining if the first two cards dealt to the player comprise a Pair—e.g. have the same rank. In one embodiment, the player wins the Pair bet if this criteria is satisfied, regardless of whether or not they win any of their other wagers or bets (although the player is preferably required to place their ante wager and the like in order to participate in the game and thus have their Pair bet be allowed).

In one embodiment, if the player wins their Pair bet, then they are entitled to spin a bonus wheel which reveals the award for their winning bet. In one embodiment, the process for spinning the wheel may be similar to that described above. In one embodiment, the wheel is configured as follows:

TABLE 4

| Pair Bet Bonus Spin: | | | |
|---|---|---|---|
| Number of Jackpots | Jackpot Amount | Community Amount | Wheel positions |
| 1 | $5,000.00 starting | | Jackpot (1 space) |
| 5 | $2,500.00 | | 4 |
| 20 | $1,000.00 | | 7 |
| 80 | $ 500.00 | $100.00 | 3 |
| 325 | $ 350.00 | | 8 |
| 500 | $ 250.00 | $ 50.00 | 9 |
| 880 | $ 250.00 | | 11 |
| 950 | $ 75.00 | | 12 |
| 2,800 | $ 25.00 | $ 15.00 | 6 |
| 5,500 | $ 70.00 | | 10 |
| 8,500 | $ 60.00 | | 5 |
| 25,439 | $ 50.00 | | 2 |

In this embodiment, certain of the outcomes may have community awards wherein awards are awarded to other players. In one embodiment, players who placed the Pair bet are entitled to the community award if it is hit by another player. In a preferred embodiment, the jackpot is a progressive jackpot (which may start at $5,000 and increase until it is won; the rate of increase may be, for example, 6% of each placed Pair bet).

Of course, the wheel spin event could be implemented by spinning a physical spinning wheel, such as where the stopping position of the wheel relative to a pointer or other selector is controlled, such as via a motor. The award selection event might also be represented by other than a wheel spin, but by other events.

It will be appreciated that the game might be presented with only the Pair side bet, with only the optional proposition bets, and/or with other or additional optional bets. Further, because the proposition and bonus bets are optional, a player might place none, one, two or all three of the optional bets.

It will also be appreciated that the winning values and odds for the optional bets might vary. In one embodiment, one or more optional bet awards include a community award. However, no community awards might be offered or additional or other community awards might be offered.

Various aspects of the invention will now be appreciated. In one embodiment, a game offers a player multiple wagering options, such as a four tier wagering option comprising an ante or initial wager, a secondary wager, a tertiary wager and at least a quaternary wager. Each level of wagering increases the excitement of the game due to the increases risk as the wagers compile, and wherein the outcome of those wagers is tied to the same outcome criteria (such as a comparison of the player's hand to the dealer's hand). In a preferred embodiment, the ante or initial wager is required to enter the game and, unlike games such as Texas Hold'em Bonus™ and Ultimate Texas Hold'em™ which allow a player to check on betting opportunities, the secondary, tertiary and quaternary wagers must all be placed by the player in order to be entitled to play out their hand against the dealer. If the player does not place all of those wagers, then the player folds and automatically loses those wagers.

At the same time, the game preferably also offers at least one optional bet. These bets are preferably independent of the wagers and have an outcome which is determined apart from the criteria of the wagers. In a preferred embodiment, the player is eligible to play out the optional bets even if the player folds and loses their wagers. Players who placed optional bets thus remain interested in the game until the end, even if they have folded along the way, because they remain eligible for an optional bet win.

Also, in many games, such as Ultimate Texas Hold'em™, the house is provided an advantage by requiring that the dealer's hand have a certain rank or minimum qualification in order to be played out against the player/the player's hand. This reduces the probability of the house losing the wager because low ranking house hands (which are easier for the player's hand to beat) are excluded from play. In accordance with the present invention, the combination of wagers allows the game to be played in a manner where the dealer hand always qualifies (e.g., if the player places the required wagers, their hand is compared to the dealer's hand no matter how low the dealer's hand may rank, thus improving the probability of the player winning the wager that their hand will beat the dealer's hand).

In one embodiment, a variety of winnings may be paid. In one embodiment, winnings may be paid based upon one or more pay tables which offer increased or high payouts. These payouts generate game excitement due to the probability of potentially high wins in comparison so the size of wagers or bets placed. Other types of winnings than monies or monetary value credits/chips might be awarded, such as points, tangible prizes, discounts or the like.

In one embodiment of the invention, as described above relative to step S1, a player may be required to place both an ante bet or wager to play the game, and one or more side or bonus bets, if the player wishes to participate in those side or bonus opportunities. One embodiment of the invention comprises a game having ante and side or bonus bet features, such as where the ante is required to play the game (or at least a base game portion thereof) and the side or bonus bet is required to participate in a side or bonus bet feature or portion of the game, where the player places a single wager that includes a portion for the ante wager and a portion for one or more side of bonus bet features. This bet or wager may be referred to herein as a "combined bet."

As one example, a game may have an ante requirement and a single bonus bet opportunity. The required ante might be $1 and the required bonus bet might be $4. In accordance with the invention, the player may be required to make a single $5 wager (or wager of another amount, such as less than or more than the normal amount of the ante and the side bet combined) which then entitles the player to play the base game (assuming the player makes any other required wagers for the game or performs other required actions to play the game, such as those noted in the game described above) and entitles the player to participate in the bonus bet feature.

While table games typically have fixed ante and bonus bet requirements, the present invention allows the game presenter/operator to allocate different portions of the combined bet to the ante and side bet features. For example, relative to the example above of a $5 combined bet, the operator might split the combined bet based upon an allocation split where $1 goes towards the ante and $4 goes towards the side bet feature. However, the operator might split the combined bet in other manners, such as $2 towards the ante and $3 towards the side bet feature (or any number of other splits).

As one example, an operator might wish to change an allocation of the ante and side or bonus bet portions of the combined bet because of differences in the "house hold" of the two parts of the wager. For example, the house hold on ante wagers placed on the underlying game might be 8%, while the house hold on the bonus bet might only be 5%. The operator might thus increase the portion of the combined wager towards the ante side so as to retain a greater portion of the combined wager (for example, changing the allocation from the original or normal split on a $5 combined bet from the base $1 towards the ante and $4 towards the bonus bet to $2 towards the ante and $3 towards the bonus bet).

In situations where the side bet has a paytable of fixed awards, if the operator changes the portion of the combined bet that goes towards the side bet, the operator might also or instead change the paytable, such as by changing the payouts for one or more winning outcomes of the side bet. As one example, for a game having a $5 side bet, a winning outcome might have a 1/100 chance of occurring and might have an assigned payout of $450 (10% house hold). If the operator changed the combined bet allocation so that only $4 went to the side bet, the paytable might be changed so that the wining payout is $380 (5% house hold).

For example, often the side bet funds a progressive jackpot (that increases based on some portion of each side bet that is placed). The operator might change the amount that goes towards the progressive meter. Again, as an example, if $4 of each $5 side bet wager is assigned to a progressive jackpot, if the operator changed the allocation of the combined bet so that only $4 goes towards the side bet, then the operator might only put $3 of that $4 towards the progressive meter (in both cases thus keeping $1 of the portion of the combined bet that is assigned to the side bet).

In one embodiment, the betting configuration of the invention may advantageously be implemented at a gaming table. In one embodiment, the combined bet may be made by a player placing a combined wager of one or more chips. The combined bet may be made at a single betting location. For example, instead of the table having an ante and bonus bet location, the table might simply have a bonus bet location (and no ante location), since the ante wager is part of the combined bet that includes the ante and bonus bet, or a "combined" or "single bet" location.

In a preferred embodiment, the combined bet may be placed relative to a single wagering location, such as having an associated wager input receiving device or sensor 32, such as that described above. The player may provide input of the combined bet to the input receiving device 32 at their betting location, such as by associating one or more chips with the combined wagering location and the associated input receiving device 32 during a designated betting period (in this case, at the beginning of the game).

Most importantly, in accordance with the present invention, the table controller 100 preferably includes software which is executable by the processor 102 thereof to track and report the combined wagers and, in one or more embodiments, generate ante and bonus bet allocation splits.

For example, in one embodiment, the operator may provide an input to the table controller 100 of the combined bet allocation or split, such as $2 towards the ante and $3 towards the side bet of a $5 combined bet. Of course, at one or more times, the operator might provide input to the table controller of a different split or allocation. Upon receiving a combined bet by the player, the table controller 100 may log the combined bet and thus a running count of each ante and side bet, or may actually calculate a split of funds, such as $2 ante/$3 side bet, such as to create a running accounting of the amounts of wager received for the ante and side bet over time (such as from multiple players and across multiple games per day). As one example, during a given day, the operator might input a split of $2 ante/$3 side bet and the table controller 100 might log 100 combined $5 wagers, thus allocating $200 towards the ante and $300 towards the side bet. This generated wager information may be used for accounting purposes, including table reconciliation, via the table controller 100 or via reporting from the table controller 100 to a casino accounting system.

In accordance with the invention, the table controller 100 may also implement different pay tables based upon different combined bet allocations. For example, when an operator selects a $2/$3 split of the combined wager, a first bonus bet paytable may be used and, for example, displayed to the dealer and/or players as controlling the payout(s) for a winning side bet. If the operator changed the split, such as to $1/$4, the table controller 100 might then display or implement a different pay table.

Similarly, the table controller 100 may implement the progressive jackpot, including causing an associated table display to display current jackpot information. In accordance with the invention, the table controller 100 may again allocate the correct portion of each combined bet towards the progressive meter.

Figure 8:
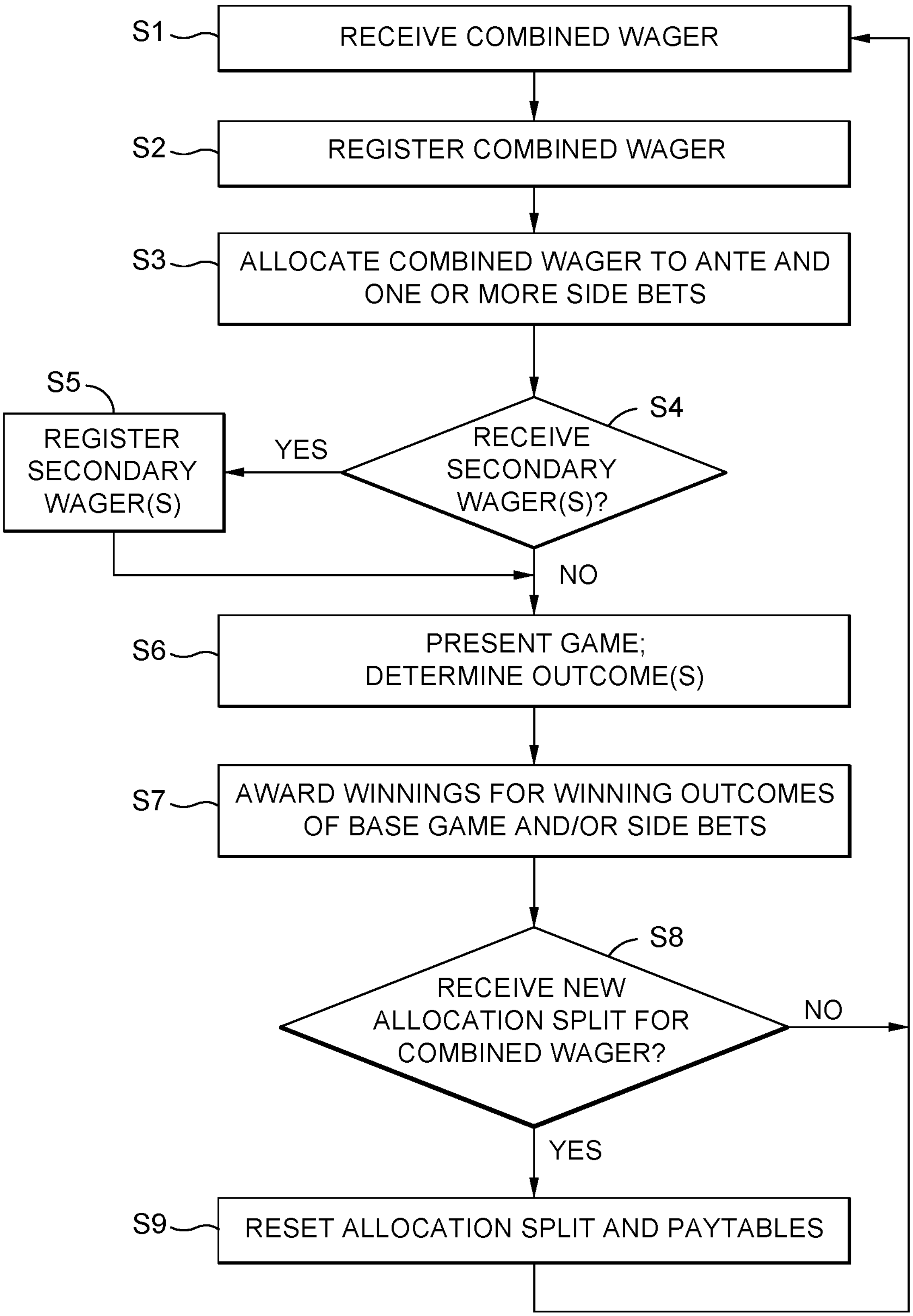
FIG. 8 is a flow diagram illustrating another embodiment of the invention.

One embodiment of this aspect of the invention is illustrated in FIG. 8. In one embodiment, in a step S1, a combined wager is received from a player relative to a game. As indicated herein, the combined wager might be received by a player associating one or more gaming chips or other betting elements with a betting location of a game layout of a gaming table, and detecting the wager via a wager input sensor.

In a step S2, the combined wager is registered. In one embodiment, this comprises a table controller receiving a signal or input of the combined wager from the sensor and then logging that combined wager (such as to a particular player (as might be identified by a player tracking identifier) or player location (such as where there are multiple player locations at a gaming table)).

In a step S3, combined wager is allocated to an ante wager and one or more side or bonus bets. The ante wager might be required to play the game or at least a base portion thereof and the side or bonus bet may be required to participate in a side or bonus bet feature or portion of the game. In one embodiment, this allocation is performed by the table controller (but might be performed by an external server or other device), such as based upon an allocation split. The allocation split may be input by the operator of the base and may be variable.

In a step S4, it is determined if the player placed one or more secondary wagers. Such secondary wagers may be option or might be required, for example, to play the base game or to continue to play the base game to conclusion. The one or more secondary wagers might, for example, be received at one or more secondary wagering location of a gaming layout of a gaming table and be sensed by a wager detector or sensor.

In a step S5, if one or more secondary wagers are received, those wagers are preferably registered. This may similarly comprise receiving, by a table controller of a gaming table, an input or signal from a secondary wager detector or sensor and then logging or registering the one or more secondary wagers.

In a step S6, the game is presented and the one or more outcomes thereof (such as of the main or base game and the one or more side bet or bonus features) are determined, such as based upon the rules of the game.

In a step S7, winnings are preferably awarded for winning game outcomes. In one embodiment, first winnings may be awarded for a winning base or main game and second winnings may be awarded for one or more winning side bets (and both, if the player has won both portions). This may comprise crediting winnings to a player, awarding chips, money or the like to the player.

In one embodiment, winnings may be paid based upon one or more pay tables, such as a first paytable of winning outcomes and awards for the base game and a second paytable for a winning outcome of the side bet feature. In one embodiment, as noted above, these pay tables may change, such as based upon an input or selected combined bet allocation split. In some embodiments, the awards might comprise fixed value payouts or jackpots, or might comprise variable value awards, such as progressive jackpots.

In a step S8, it is determined if the operator has indicated a new allocation split for the combined bet. This may comprise, for example, the table controller receiving an input of a new allocation split for the combined bet for the game, such as from the operator (dealer, pit boss or the like). If not, the process may repeat. If so, as in step S9, the allocation split for the combined wager may be updated, along with any new pay tables.

Of course, other embodiments of the invention are possible, including methods including additional steps or features and methods having steps in a different order. For example, while a game may have secondary wagers that are placed before the game is presented, in other embodiments one or more secondary wagers may be placed during the presentation of the game.

This aspect of the invention has numerous benefits. Currently, players that play table games that require an ante wager and then a separate side bet may be deterred from the side bet, feeling that they are already paying an ante just to play the game. In accordance with the invention, instead of requiring two separate wagers, a single wager is used to fund both the ante and side bet. This allows the operator to present a game to the player that has both a base portion and a side bet portion, but requires the player to only place one wager.

Further, an aspect of the invention is a method and system which allows the operator to not only track these combined wagers, but allows the operator to change the allocated portion of the combined wager that is applied to the ante portion and the side bet portion. The change in allocation can occur without changing the amount of the combined wager that is presented to the player as being required to play the game.

It will be appreciated that this aspect invention may be applied to a variety of table games, whether they are card games, dice games or other types of games.

The principles of the invention may be applied to games which have other betting configurations. For example, while a game to which the principles of the invention is applied may have an ante in a true sense (such as wherein winnings may be paid for a winning game outcome as to the amount of the ante—either in the amount of the ante or an amount greater than the ante), the "ante" may simply be a collection tax (such as for a card room) or a house "vig" on the game or the like, where those wagered funds are simply collected and do not offer a potential for direct winnings. Further, the game might have more than one side bet opportunity. For example, if a game requires an ante and has first and second side bet features, a combined wager might be received and allocated to the ante and first and second side bets. In other embodiments, a combined wager might be received and allocated to an ante and first side bet, and other bets or wagers may be received separately. Those wagers might comprise, for example, other main game wagers (such as check or raise wagers or the like) or other side bet wagers.

The game of the invention or other aspects of the invention, such as the "combined bet", may be implemented in various manners, such as via various gaming machines, devices and/or systems. For example, the methods of game play and presentation may also be implemented via a gaming machine or device. Such a gaming machine may have various configurations.

The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 7:
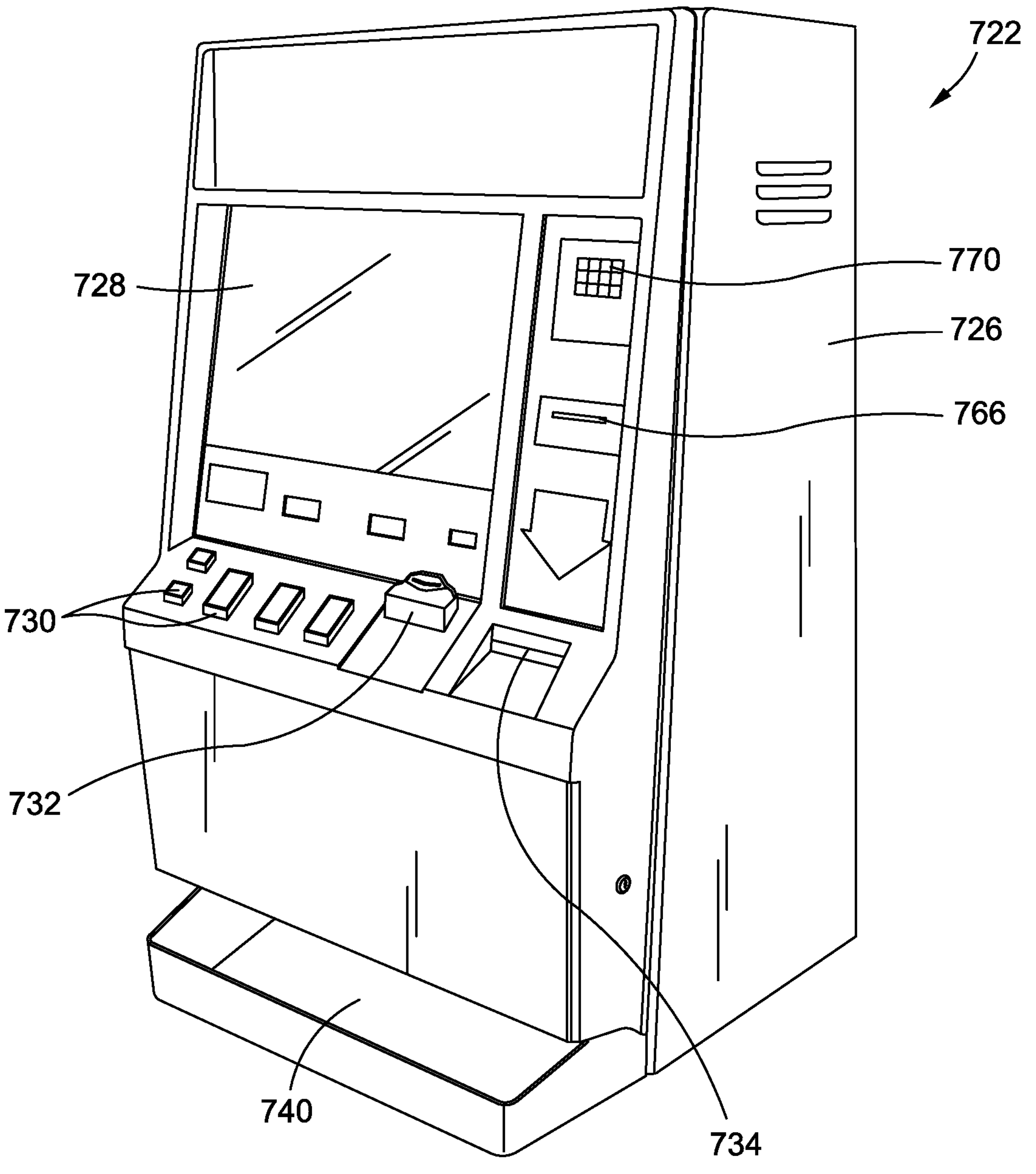
FIG. 7 illustrates one embodiment of a gaming machine for presenting a game in accordance with the invention.

One configuration of a gaming machine 722 is illustrated in FIG. 7. As illustrated, the gaming machine 722 generally comprises a housing or cabinet 726 for supporting and/or enclosing various components required for operation of the gaming machine. In the embodiment illustrated, the housing 726 includes a door located at a front thereof, the door capable of being moved between an open position which allows access to the interior, and a closed position in which access to the interior is generally prevented. The configuration of the gaming machine 722 may vary. In the embodiment illustrated, the gaming machine 722 has an "upright" configuration. However, the gaming machine 722 could have other configurations, shapes or dimensions (such as being of a "slant"-type, "bar-top" or other configuration as is well known to those of skill in the art).

The gaming machine 722 preferably includes at least one first display device 728 configured to display game information. The display device 728 may comprise an electronic video display such as a cathode ray tube (CRT), high resolution flat panel liquid crystal display (LCD), projection LCD, plasma display, field emission display, digital micromirror display (DMD), digital light processing display (DLP), LCD touchscreen, a light emitting display (LED) or other suitable displays now known or later developed, in a variety of resolutions, sizes and formats (e.g. 4:3, widescreen or the like). The display device 728 may be capable of projecting or displaying a wide variety of information, including images, symbols and other indicia or information associated with game play, game promotion or other events. The gaming machine 722 might include more than one display device, such as a main or first display device 28 and a secondary display device. The two or more display devices might be associated with the housing or the gaming machine 722 might also include a top box or other portion which includes the one or more second display devices. Also, the gaming machine 722 might include side displays (such as mounted to the exterior of the housing 726) and might include multiple displays of differing sizes.

The gaming machine 722 is preferably configured to present one or more games upon a player making a monetary payment or wager. In this regard, as described in more detail below, the gaming machine 722 includes mechanism or means for accepting monetary value.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 722 preferably includes a mechanism or means for returning unused monetary funds and/or dispensing winnings to a player.

The gaming machine 722 preferably includes one or more player input devices 730 (such as input buttons, plunger mechanisms, a touch-screen display, joystick, touch-pad or the like). These one or more devices 730 may be utilized by the player to facilitate game play, such as by providing input or instruction to the gaming machine 722. For example, such input devices 730 may be utilized by a player to place a wager, cause the gaming machine 22 to initiate a game, to "cash out" of the gaming machine, or to provide various other inputs.

In one preferred embodiment, the gaming machine 722 includes at least one microprocessor or controller for controlling the gaming machine, including receiving player input and sending output signals for controlling the various components or peripheral devices of the machine 722 (such as generating game information for display by the display devices). The controller may be arranged to receive information regarding funds provided by a player to the gaming machine 722, receive input such as a purchase/bet signal when a purchase/bet button is depressed, and receive other inputs from a player. The controller may be arranged to generate information regarding a game, such as generating game information for display by the at least one display device (such as information comprising playing cards as described above), for determining winning or losing game outcomes and for displaying information regarding awards for winning game outcomes, among other things.

The controller may be configured to execute machine readable code or "software" or otherwise process information, such as obtained from a remote server. Software or other instructions may be stored at a memory or data storage device, e.g. in a fixed or non-transitory configuration. The memory may also store other information or data, such as data stored in table or other forms (including, but not limited to look-up tables, pay tables and other information including tracked game play information). The gaming machine 722 may also include one or more random number generators for generating random numbers (such as implemented by a random number generator software module stored in the memory and executable by the processor), such as for use in selecting playing cards and for presenting the game in a random fashion (e.g. whereby the game is presented in a manner in which the player cannot control the outcome) or pseudo-random fashion (e.g. such as where the game includes a skill component which can affect the outcome of the game).

Preferably, the controller is configured to execute machine readable code or instructions (e.g. software) which are configured to implement the game. In this regard, the gaming machine 722 is specially configured to present the game of the invention via specific software and/or hardware which causes the gaming machine to operate uniquely. For example, the controller of the gaming machine 722 may be configured to detect a wager, such as a signal from a player's depressing of the "bet one" button. Upon such an event and/or the player otherwise signaling the gaming machine to present the game, the controller may be configured to cause the at least one display 728 to display unique information, such as a unique graphical interface or unique game display, including game symbols or other game information. The controller may accept input from a player of game inputs, such as a request to spin reels or the like, via the one or more player input devices of the gaming machine 722. As indicated above, the machine readable code may be configured in various manners, such as by having various "modules" of software which are designed to implement specific features of the game play or game presentation.

The gaming machine 722 may be configured to generate and present games in a stand-alone manner or it may be in communication with one or more external devices or systems at one or more times. The gaming machine 722 might communicate with one or more of such external devices or systems via one or more communication ports or other interface devices. These ports or interface devices may be configured to implement various communication protocols (including proprietary protocols) and communicate via wireless, wired or other communication link. For example, the gaming machine 722 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 722 is configured to present one or more wagering games. The gaming machines 722 is preferably configured to accept value, such as in the form of coins, tokens, paper currency or other elements or devices representing value such as monetary funds. Thus, as indicated above, the gaming machine 722 preferably includes a mechanism or means for accepting monetary value. For example, the gaming machine 722 might include a coin acceptor 732 for accepting coins. Of course, associated coin reading/verifying devices and coin storage devices may be associated with the gaming machine 722 if it is configured to accept coins. Likewise, the gaming machine 722 might include a media reader 734. Such a reader may be configured to accept and read/verify paper currency and/or other media such as tickets. Of course, in such event the gaming machine 722 may further be configured with one or more paper currency or ticket storage devices, such as cash boxes, and other paper currency or media handling devices (including transport devices).

The gaming machine 722 might also be configured to read FOBs, magnetic stripe cards or other media having data associated therewith and via which value or funds may be associated with the gaming machine 722. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications, such as to enable the transfer of funds from the player to the gaming machine or system.

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a “play game” input, such as by pressing a “spin” button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 722 is configured to award winnings for one or more winning wagering game outcomes. Such winnings may be represented as credits, points or the like. In one embodiment, the player may “cash out” and thus remove previously associated funds and any awarded winnings or such may otherwise be paid to the player. These winnings may be associated with the player’s credit balance, thus increasing the player’s credit balance.

In one embodiment, the player may provide an input to the gaming machine 722 to indicate their desire to cash out, such as by selecting a “cash out” button or touch screen feature or providing other input. In response, a monetary value represented by the player’s credit balance or the like is preferably paid, transferred or otherwise provided to the player. For example, upon an award or at cash-out, associated funds may be paid to the player by the gaming machine 722 dispensing coins to a coin tray 740. In another embodiment, funds may be issued by dispensing paper currency or other media. In yet another embodiment, a player may be issued a media, such as a printed ticket, which ticket represents the value which was paid or cashed out of the machine. The aspects of gaming machine “ticketing” systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In this regard, the gaming machine 722 may include one or more media printers or writers 48. In other embodiments, the cash-out mechanism may result in the funds value being transferred to an external device or account, such as a player’s casino account (such as associated with a casino server), a remote bank or other financial account, or an electronic device such as a player’s phone, PDA or tablet.

The gaming machine 722 may also include a player tracking device, such as a card reader 766 and/or an associated keypad 770 or other input device (such as a touch screen display). Such player tracking devices are well known and may permit the game operator to track play of players of the gaming machine. The tracked play may be utilized to offer player bonuses or awards.

The main game controller or processor may communicate with several of the peripheral devices via one or more intermediary controllers. For example, some of the peripheral devices might comprise USB type or enabled devices which are controlled by an intermediary USB controller.

A casino may have numerous such gaming machines 722, such as located on a casino floor or in other locations. Of course, such gaming machines 722 might be used in other environments, such as an airport, a bar or tavern or other locations.

It will be appreciated that the gaming machine illustrated in FIG. 7 is only exemplary of one embodiment of a gaming machine. For example, it is possible to for the gaming machine to have various other configurations, including different shapes and styles and having different components than as just described.

For example, instead of comprising a “casino”-style gaming machine, it is possible for the game of the invention to be presented on a computing device, including at a home or office computer or a player’s mobile electronic device such as a PDA, phone or the like. In one embodiment, a player might log in to a casino server and the controller of the casino server may cause game information to be delivered to the player’s computer via a communication link and then be displayed on a display of the player’s computer. The communication link might comprise or include the Internet, a casino network such as a wired or wireless LAN, or combinations of public and/or private networks including wired and/or wireless links. In such a configuration it will be noted that the term “controller” may comprise more than one device. For example, in a server-based environment, a controller at a server may generate game information and transmit that information to a local controller at a gaming machine or a player’s computer or other electronic device. The local controller at the gaming machine or the player’s computer or other electronic device may then cause game information to be displayed on one or more associated displays.

The gaming machine 722 may, as noted above, be part of a system which includes other devices. For example, the gaming machine 722 may communicate with one or more casino systems, such as a player tracking server or system, an accounting system or server, a ticketing system, a bonusing system, a tournament system, other gaming machines, and external devices.

It will be appreciated that the methods of the invention may be implemented in other manners than as described herein. For example, the steps of the method(s) may be performed in other orders and/or might include additional or other steps.

As indicated herein, aspects of the invention might be applied to other games or games using other game pieces. For example, the method of the invention might apply to a dice type game where dice indicia are utilized and a player attempts to receive or achieve certain dice combinations and the player and/or dealer hands comprise combinations of dice.

In one embodiment, at least one initial card is dealt to each player of the game and each player forms their own hand using the card(s) dealt to them and the community cards. In another embodiment, a single player hand might be played against a dealer hand, whereby multiple players play or wager upon the same hand.

In one embodiment, other or additional proposition bets might be defined. Also, the game might be played with additional wagers, such as fifth wager or more.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of presenting a game to a player, said game having a base game portion and at least one side bet feature, comprising the steps of:

providing a gaming table comprising:

a table controller having a processor and a memory;

a playing surface; and a game layout, the game layout comprising a first betting location, a first wager input sensor associated with said first betting location, said first wager sensor connected to the table controller, said at least one first wager input sensor comprising a proximity sensor which is configured to detect the association of one or more first physical wagering chips with said first betting location, at least one second betting location, and a second wager input sensor associated with said least one second betting location, said at least one second wager input sensor comprising a proximity sensor which is configured to detect the association of one or more second physical wagering chips with said second betting location, said second wager input sensor connected to the table controller;

at least one video display device in communication with said table controller;

receiving a combined first wager at said first betting location by sensing at least one first physical wagering chip which is associated with said first betting location with the first wager input sensor;

receiving a second wager at said at least one second betting location by sensing at least one second physical wagering chip which is associated with said second betting location with the second wager input sensor;

registering, via said processor of said table controller, a first monetary-value amount of said combined wager based upon an output of said at least one first wager input sensor and a second monetary-value amount of said second wager based upon an output of said at least one second wager input sensor;

storing, in said memory associated with said processor of said table controller, a selected combined wager allocation split, wherein said combined wager allocation split is variable and said selected combined wager allocation split comprise one of a plurality of different combined wager allocation splits;

allocating via said processor of said table controller, based upon said selected combined wager allocation split stored in said memory, a portion of said first monetary-value amount of said combined first wager to an ante to play said game and a remaining portion of said first monetary-value amount of said combined first wager to at least one side bet required to participate in said at least one side bet feature;

allocating, via said processor of said table controller, said second wager to said base game portion of said game;

graphically displaying, based upon an output of said table controller provided to said at least one video display device, a payout amount for a winning outcome of said side bet for said stored combined wager allocation split, wherein one or more of said plurality of different combined wager allocation splits have different associated payout amounts;

dealing, from at least one deck of physical playing cards onto said gaming table, one or more playing cards;

determining an outcome of said game with reference to one or more of said dealt playing cards and awarding first winnings to said player for a winning outcome of said game; and determining an outcome of said at least one side bet feature with reference to one or more of said dealt playing cards and awarding second winnings defined by said payout amount to said player for a winning outcome of said at least one side bet feature.

2. The method in accordance with claim 1, wherein said at least one first and at least one second wager input sensors comprise one or more of a capacitive, light emitting, light detecting and/or RFID proximity sensor.

3. The method in accordance with claim 1, further comprising receiving, via an input device to said table controller, input regarding said selected combined wager allocation split.

4. The method in accordance with claim 1, wherein when said selected wager allocation split comprises a first wager allocation split, displaying a first paytable of winning outcomes and awards and awarding second winnings defined by said first paytable, and wherein when said selected wager allocation split comprises a second wager allocation split, displaying a second paytable of winning outcomes and awards and awarding second winnings based upon said second paytable.

5. The method in accordance with claim 1, wherein said payout amount comprises at least a portion of a progressive jackpot and said step of allocating said combined wager further comprises allocating a portion of said remining portion of said combined first wager to said progressive jackpot.

6. The method in accordance with claim 1, wherein said at least one side bet comprises a first side bet and a second side bet.

7. A method of presenting a game to a player, said game having a base game portion and at least one side bet feature, comprising the steps of:

providing a gaming table comprising:

a table controller having a processor and a memory;

a playing surface; and a game layout, the game layout comprising a first betting location having a first wager input sensor connected to the table controller, said at least one first wager input sensor comprising a proximity sensor which is configured to detect the association of one or more physical wagering chips with said first betting location;

at least one video display device in communication with said table controller;

receiving a combined first wager at said first betting location by sensing at least one first physical wagering chip which is associated with said first betting location at the first wager input sensor;

registering, via said processor of said table controller, a first monetary-value amount of said combined wager based upon an output of said at least one first wager input sensor;

storing, in said memory associated with said processor of said table controller, a selected combined wager allocation split, wherein said combined wager allocation split is variable and said selected combined wager allocation split comprise one of a plurality of different combined wager allocation splits;

allocating, via said processor of said table controller, based upon said selected wager allocation split stored in said memory, a portion of said first monetary-value amount of said combined first wager to an ante to play said game and a remaining portion of said first monetary-value amount of said combined first wager to at least one side bet required to participate in said at least one side bet feature;

graphically displaying, based upon an output of said table controller provided to said at least one video display device, a payout amount for a winning outcome of said side bet for said stored combined wager allocation split, wherein one or more of said plurality of different combined wager allocation splits have different associated payout amounts;

utilizing one or more game pieces to present said game;

determining an outcome of said game with reference to one or more of said game pieces and awarding first winnings to said player for a winning outcome of said game; and determining an outcome of said at least one side bet feature with reference to one or more of said game pieces and awarding second winnings defined by said payout amount to said player for a winning outcome of said at least one side bet feature.

8. The method in accordance with claim 7, wherein said one or more game pieces comprise physical playing cards dealt from one or more decks of cards.

9. The method in accordance with claim 7, further comprising receiving, via an input device to said table controller, input regarding said selected wager allocation split.

10. The method in accordance with claim 7, wherein when said selected wager allocation split comprises a first wager allocation split, displaying a first paytable of winning outcomes and awards and awarding second winnings defined by said first paytable, and wherein when said selected wager allocation split comprises a second wager, allocation split, displaying a second paytable of winning outcomes and awards and awarding second winnings based upon said second paytable.

11. The method in accordance with claim 7, wherein said payout amount comprises at least a portion of a progressive jackpot and said step of allocating further comprises allocating a portion of said remining portion of said combined wager to said progressive jackpot.

12. The method in accordance with claim 7, wherein said at least one first and at least one second wager input sensors comprise one or more of a capacitive, light emitting, light detecting and/or RFID proximity sensor.

13. A game table wagering system comprising:

a gaming table, said gaming table comprising:

a playing surface supported by a supporting structure; and a game layout, the game layout comprising a first betting location;

a first wager input sensor associated with said first betting location, said at least one first wager input sensor comprising a proximity sensor which is configured to detect the association of one or more physical wagering chips with said first betting location;

a table controller, said table controller comprising a processor, a memory;

at least one video display device in communication with said table controller; and machine-readable code stored in said memory of said table controller and configured, when executed by said processor of said table controller, to cause said processor to:

store, in said memory, a combined wager allocation split, wherein said combined wager allocation split is variable and said selected combined wager allocation split comprise one of a plurality of different combined wager allocation splits;

register, in response to a signal from said at least one first wager input sensor of a wager in the form of one or more first physical wagering chips placed at said first betting location, a combined first wager comprising a first monetary-value amount;

allocate, based upon said selected wager allocation split, a portion of said first monetary-value amount of said combined first wager to an ante to play a base portion of a game a remaining portion of said first monetary-value amount of said combined first wager to at least one side bet required to participate in said at least one side bet feature of said game; and cause said at least one video display device to graphically display a payout amount for a winning outcome of said side bet for said stored combined wager allocation split, wherein one or more of said plurality of different combined wager allocation splits have different associated payout amounts.

14. The game table wagering system in accordance with claim 13, wherein game layout further comprising at least one second betting location, and further comprising a second wager input sensor associated with said least one second betting location, said second wager input sensor connected to the table controller.

15. The game table wagering system in accordance with claim 14, wherein said machine-readable code stored in said memory is further configured, when executed by said processor, to cause said processor to register, in response to a signal from said second wager input sensor of a wager at said second betting location, a second wager and to allocation said second wager to said base game portion of said game.

16. The game table wagering system in accordance with claim 14, wherein said machine-readable code stored in said memory is further configured, when executed by said processor, to cause said processor to award first winnings for a winning outcome of said base game portion of said game and award second winnings for a winning outcome of said at least one side bet feature of said game.

17. The game table wagering system in accordance with claim 16, wherein said second winnings comprise at least a portion of a progressive jackpot and processor further allocates a portion of said remining portion of said combined first wager to said progressive jackpot.

18. The game table wagering system in accordance with claim 13, wherein said table controller is configured to receive input regarding said selected wager allocation split from an input device associated with said gaming table.

19. The game table wagering system in accordance with claim 13, wherein said at least one first wager input sensor comprises one or more of a capacitive, light emitting, light detecting and/or RFID proximity sensor.

* * * * *